(12) United States Patent
Chang et al.

(10) Patent No.: US 11,650,393 B2
(45) Date of Patent: May 16, 2023

(54) CAMERA MODULE HAVING AXIAL ASSEMBLING STRUCTURES AND ELECTRONIC DEVICE

(71) Applicant: LARGAN DIGITAL CO.,LTD., Taichung (TW)

(72) Inventors: Lin An Chang, Taichung (TW); Ming-Ta Chou, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 332 days.

(21) Appl. No.: 17/001,480

(22) Filed: Aug. 24, 2020

(65) Prior Publication Data

US 2022/0011537 A1    Jan. 13, 2022

(30) Foreign Application Priority Data

Jul. 8, 2020    (TW) ................................ 109123066

(51) Int. Cl.
     *H04N 5/225*     (2006.01)
     *G02B 7/09*      (2021.01)
     *G02B 27/64*     (2006.01)
     *G03B 13/36*     (2021.01)
     *G03B 5/00*     (2021.01)

(52) U.S. Cl.
CPC .............. *G02B 7/09* (2013.01); *G02B 27/646* (2013.01); *G03B 5/00* (2013.01); *G03B 13/36* (2013.01);
(Continued)

(58) Field of Classification Search
CPC .... G02B 7/09; G02B 27/646; G02B 13/0065; G02B 7/022; G02B 7/08; G02B 13/0025;
(Continued)

(56) References Cited

U.S. PATENT DOCUMENTS 8,928,766 B2    1/2015   Hu et al.
9,264,591 B2    2/2016   Topliss
(Continued)

FOREIGN PATENT DOCUMENTS

CN      208076809 U    * 11/2018  ............... G02B 7/08
TW      I585483        6/2017

OTHER PUBLICATIONS

Indian Examiner's Report dated Feb. 15, 2022 as received in application No. 202134015635.

*Primary Examiner* — Padma Haliyur
(74) *Attorney, Agent, or Firm* — Maschoff Brennan

(57) ABSTRACT

A camera module includes an imaging lens module, an axial driving device and an image sensor module. The imaging lens module includes at least one optical imaging lens element. The axial driving device is configured to drive the optical imaging lens element to move in a direction parallel to an optical axis. The image sensor module is disposed on an image side of the axial driving device and includes an image sensor and a substrate. The image sensor is configured to convert light passing through the imaging lens module into an image signal. The axial driving device includes a base, and the base has a first axial assembling structure. The substrate has a second axial assembling structure abutted against the first axial assembling structure, so that the imaging lens module is aligned with the image sensor module in a direction along the optical axis.

15 Claims, 28 Drawing Sheets

(52) U.S. Cl.
CPC ......... *H04N 5/2253* (2013.01); *H04N 5/2254* (2013.01); *G03B 2205/0015* (2013.01)

(58) Field of Classification Search
CPC .. G03B 5/00; G03B 13/36; G03B 2205/0015; G03B 3/10; G03B 5/02; G03B 17/12; G03B 30/00; H04N 5/2253; H04N 5/2254; H04N 5/23287; H04N 5/2257; H04N 5/2251
See application file for complete search history.

(56) References Cited

U.S. PATENT DOCUMENTS

| | | | |
|---|---|---|---|
| 9,300,196 B2 | 3/2016 | Han | |
| 9,578,218 B2 | 2/2017 | Topliss | |
| 9,917,991 B2 | 3/2018 | Topliss | |
| 9,933,589 B2 | 4/2018 | Lo et al. | |
| 10,071,903 B2 | 9/2018 | Lin et al. | |
| 10,164,499 B2 | 12/2018 | Kim et al. | |
| 10,447,931 B2 | 10/2019 | Hu et al. | |
| 2017/0023764 A1* | 1/2017 | Chou | G02B 13/001 |
| 2017/0115463 A1* | 4/2017 | Osaka | G02B 7/023 |
| 2018/0372987 A1* | 12/2018 | Tseng | G03B 13/36 |
| 2019/0141248 A1* | 5/2019 | Hubert | H04N 5/23287 |
| 2019/0162929 A1* | 5/2019 | Tseng | G03B 13/36 |
| 2019/0235201 A1* | 8/2019 | Lu | G03B 3/10 |
| 2020/0099318 A1 | 3/2020 | Wang et al. | |
| 2020/0120242 A1 | 4/2020 | Wade | |
| 2021/0294113 A1* | 9/2021 | Park | G03B 13/36 |

* cited by examiner

CAMERA MODULE HAVING AXIAL ASSEMBLING STRUCTURES AND ELECTRONIC DEVICE

RELATED APPLICATIONS

This application claims priority to Taiwan Application 109123066, filed on Jul. 8, 2020, which is incorporated by reference herein in its entirety.

BACKGROUND

Technical Field

The present disclosure relates to a camera module and an electronic device, more particularly to a camera module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

In general, a lens unit can be driven to move by a lens driving device to automatically focus on objects. However, when the lens unit tilts, there would be a focus shift between an optimal imaging position of an imaging lens assembly of the lens unit and an image surface where an image sensor located, resulting in poor peripheral image quality. Furthermore, many conventional lens assemblies on the market usually use a voice coil motor (VCM) as a camera driver module for auto focus, and this kind of camera driver module usually consists of several components. For the requirements of accuracy and smoothness of movement of the lens unit, multiple alignment and calibration steps are needed during the assembly process of the camera driver module and the lens unit itself in order to accurately complete the assembly of those components. As a result, the manufacturing efficiency and yield rate of the camera driver module are influenced.

Accordingly, how to improve the camera driver module for simplifying the structure of the lens assembly, increasing assembling accuracy and maintaining high image quality so as to meet the requirement of high-end-specification electronic devices is an important topic in this field nowadays.

SUMMARY

According to one aspect of the present disclosure, a camera module includes an imaging lens module, an axial driving device and an image sensor module. The imaging lens module includes at least one optical imaging lens element, and the imaging lens module has an optical axis. The axial driving device is configured to drive the at least one optical imaging lens element to move in a direction parallel to the optical axis. The axial driving device includes a casing and a base. The optical imaging lens element is disposed in the casing. The base is connected to the casing. The base has a through hole, and the optical axis passes through a center of the through hole. The image sensor module is disposed on an image side of the axial driving device, and the image sensor module includes an image sensor and a substrate. The image sensor is configured to convert light passing through the imaging lens module into an image signal. The substrate faces the axial driving device, and the substrate and the base of the axial driving device are abutted against each other. The base has a first axial assembling structure, the substrate has a second axial assembling structure, and the first axial assembling structure is abutted against the second axial assembling structure, so that the imaging lens module is aligned with the image sensor module in a direction along the optical axis.

According to another aspect of the present disclosure, an electronic device includes the aforementioned camera module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
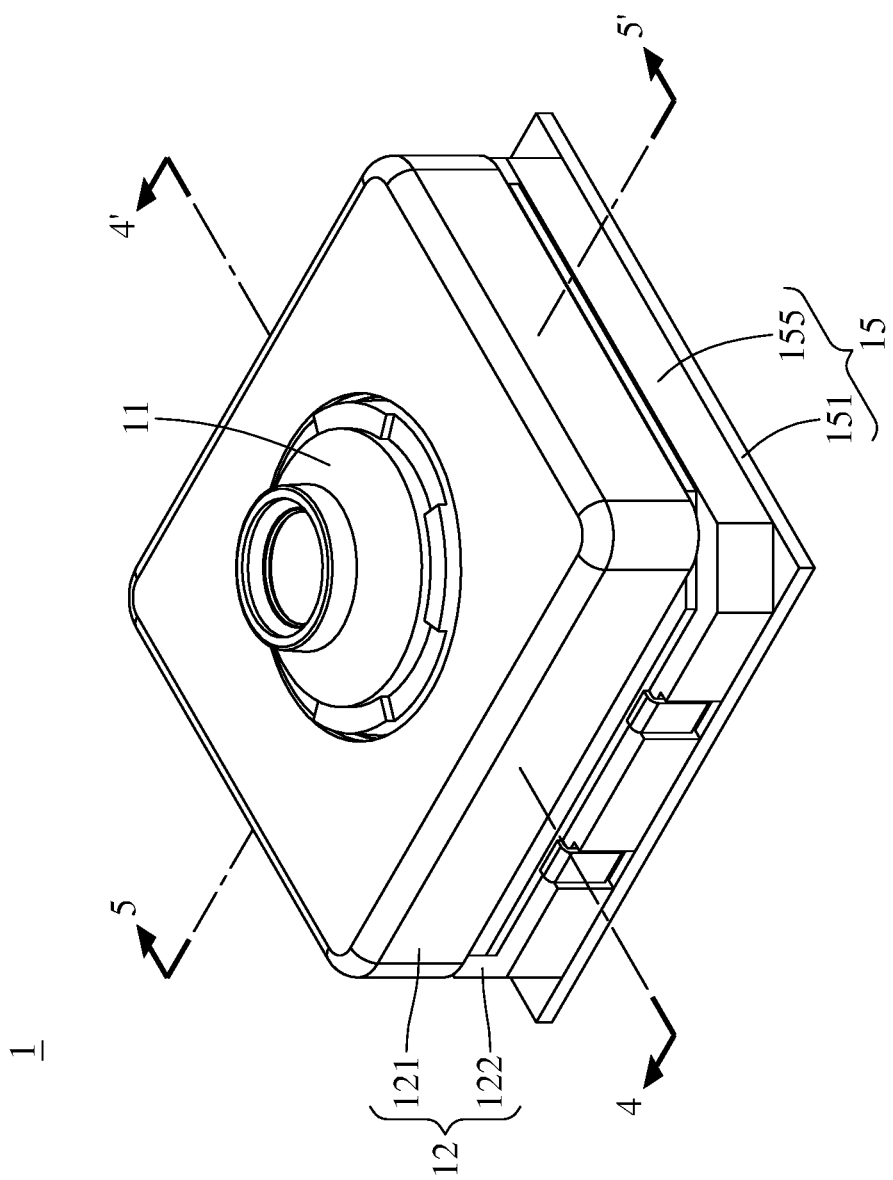
FIG. 1 is a perspective view of a camera module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides a camera module, and the camera module includes an imaging lens module, an axial driving device and an image sensor module. The imaging lens module includes at least one optical imaging lens element and has an optical axis.

The axial driving device is configured to drive the at least one optical imaging lens element to move in a direction parallel to the optical axis. The axial driving device includes a casing and a base connected to the casing. The at least one optical imaging lens element is disposed in the casing. The base has a through hole, and the optical axis passes through the center of the through hole. In addition, the axial driving device can be, for example, a micro-electro-mechanical system actuator (MEMS actuator), a piezoelectric motor or a VCM, but the present disclosure is not limited thereto.

The image sensor module is disposed on an image side of the axial driving device, and the image sensor module includes an image sensor and a substrate. The image sensor is configured to convert light passing through the imaging lens module into an image signal. The substrate faces the axial driving device, and the substrate and the base of the axial driving device are abutted against each other.

The base of the axial driving device has a first axial assembling structure, and the substrate of the image sensor module has a second axial assembling structure. The first axial assembling structure is abutted against the second axial assembling structure, so that the imaging lens module is aligned with the image sensor module in a direction along the optical axis. Therefore, it is favorable for simplifying assembling processes of the camera module and keeping the positions of the imaging lens module and the image sensor through the first and second axial assembling structures, thereby preventing focus shift and module tilting; furthermore, it is also favorable for the miniaturization of the camera module with the help of assembly through the first and second axial assembling structures. The material of the base and the material the substrate can be polycarbonate (PC), liquid crystal polymer (LCP), polypropylene (PP), resin or synthetic resin, but the present disclosure is not limited thereto. In addition, the base and the substrate can be made by injection molding, laser direct structuring (LDS), compression molding or insert molding, but the present disclosure is not limited thereto. Moreover, the shape of the first axial assembling structure and the shape of the second axial assembling structure can be annular, rectangular or arc-shaped, but the present disclosure is not limited thereto.

According to the present disclosure, the camera module can further include a filter disposed between the imaging lens module and the image sensor, and the filter is configured to filter specific wavelengths of incident light. In addition, the substrate can be a support frame for supporting the filter.

The first axial assembling structure can include a plane surface and at least one inclined surface connected to each other and forming an angle therebetween, and the second axial assembling structure can include a plane surface and at least one inclined surface connected to each other and forming an angle therebetween. The plane surfaces are substantially perpendicular to the optical axis. The plane surface of the first axial assembling structure is abutted against the plane surface of the second axial assembling structure, and the inclined surface of the first axial assembling structure is abutted against the inclined surface of the second axial assembling structure. The plane surfaces are configured to space apart the imaging lens module and the image sensor and prevent the imaging lens module from tilting. The inclined surfaces are configured to align the optical axis of the imaging lens module with the geometric center of the image sensor. Therefore, it is favorable for improving the assembling coaxiality of components by the high precision assembling structures. In this specification, a surface being substantially perpendicular to the optical axis indicates that an angle between the surface and the optical axis is 90 degrees or approximately 90 degrees.

The first axial assembling structure and the second axial assembling structure can have smooth surfaces. Therefore, it is favorable for reducing manufacturing difficulties so as to ensure fit connection between the first axial assembling structure and the second axial assembling structure.

The first axial assembling structure is located at a bottom of the base facing the image sensor module, and the first axial assembling structure can protrude from the bottom of the base towards the image sensor module. The second axial assembling structure is located at a top of the substrate facing the axial driving device, and the second axial assembling structure can be recessed from the top of the substrate in a direction away from the axial driving device. Therefore, it is favorable for providing manufacturing feasibility of molds and improving manufacturing yield rate.

The at least one inclined surface of the second axial assembling structure can surround the at least one inclined surface of the first axial assembling structure. Therefore, it is favorable for keeping the camera module compact.

The optical axis can pass through a center of the first axial assembling structure and a center of the second axial assembling structure, and the first axial assembling structure and the second axial assembling structure can surround the through hole. Therefore, it is favorable for mass production and consistent image quality of the camera module by having designs of more controllable module dimension accuracy. Moreover, the first axial assembling structure can be axisymmetric about the optical axis, and the second axial assembling structure can be axisymmetric about the optical axis.

According to the present disclosure, the axial driving device can further include a driving coil and a driving magnet. The driving coil can be disposed on a periphery of the imaging lens module, and the driving magnet and the driving coil can face each other in a direction perpendicular to the optical axis. Therefore, it is favorable for providing the imaging lens module an auto focusing function. Moreover, the driving magnet can be symmetrically disposed about the optical axis, and the driving coil can be symmetrically disposed about the optical axis. Therefore, it is favorable for balancing the driving force of the axial driving device so as to prevent the module from tilting. In one configuration, the axial driving device can further include a magnet carrier disposed in the casing, and the driving magnet can be fixed to the magnet carrier. In one configuration, the casing of the axial driving device can be used as the magnet carrier for the driving magnet to be fixed thereon.

According to the present disclosure, the image sensor module can further include an image stabilizer configured to drive the image sensor to move in at least one direction that is perpendicular to the optical axis. Therefore, it is favorable for the image sensor module to have an optical image stabilization function. Moreover, the image stabilizer being disposed on the image sensor module is favorable for reducing the size of the imaging lens module so as to effectively utilize the overall module space. Moreover, the image stabilizer can also drive the image sensor to rotate about the optical axis. Moreover, the image stabilizer can be, for example, a MEMS actuator, a piezoelectric motor or a VCM, but the present disclosure is not limited thereto.

According to the present disclosure, the image sensor module can further include an elastic wire, a flexible printed circuit board, an elastic member or a suspension member for connecting the image sensor and the substrate, such that the image sensor is movably disposed on the substrate; furthermore, those components can also transmit an electrical signal of the image sensor and provide the image sensor a degree of freedom of movement perpendicular to the optical axis or a degree of freedom in rotation about the optical axis, but the present disclosure is not limited thereto.

The through hole of the base of the axial driving device can be a tip-end aperture. The base can further have an inner inclined surface that surrounds the tip-end aperture, and an area surrounded by the inner inclined surface tapers off towards the image sensor module. Therefore, it is favorable for effectively blocking non-imaging light. Moreover, a minimum inner diameter of the through hole can be smaller than a maximum outer diameter of the imaging lens module. Therefore, it is favorable for reducing the possibility of stray light generated at the image side of the imaging lens module.

The base can further have at least three gate traces, and the gate traces can be, for example, located at chamfered corners of the base. Therefore, it is favorable for ensuring that the gate traces do not interfere with other mechanisms.

According to the present disclosure, the imaging lens module can further include a unitary member. The at least one optical imaging lens element is disposed in the unitary member, and the unitary member is disposed between the casing and the base of the axial driving device. Therefore, comparing to conventional lens assemblies that include a lens barrel and a lens carrier assembled together by their thread structures, said unitary member of threadless design is favorable for preventing particles generated during screwing between the conventional lens barrel and lens carrier and reducing overall module size. Moreover, the unitary member is, for example, a plastic member made by injection molding for the axial driving device and the optical imaging lens element to be disposed thereon. Moreover, the driving coil of the axial driving device can be disposed on a periphery of the unitary member.

According to the present disclosure, the camera module can further include a position sensing magnet and a position sensor. The position sensing magnet can be disposed on the unitary member, and the position sensor can be disposed on at least one of the substrate of the image sensor module and the base of the axial driving device. The position sensor corresponds to the position sensing magnet to detect a position of the imaging lens module. Therefore, it is favorable for having a sufficient space for a close loop design so as to increase focus speed.

According to the present disclosure, the base can include a terminal part extending towards the substrate of the image sensor module in a direction parallel to the optical axis, and the terminal part is configured to provide a driving signal to the axial driving device. In addition, the terminal part can be soldered to the substrate. Therefore, the design of the terminal part collaborated with the axial assembling structure is favorable for preventing mechanical interference when assembling the terminal part, thereby improving soldering efficiency.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
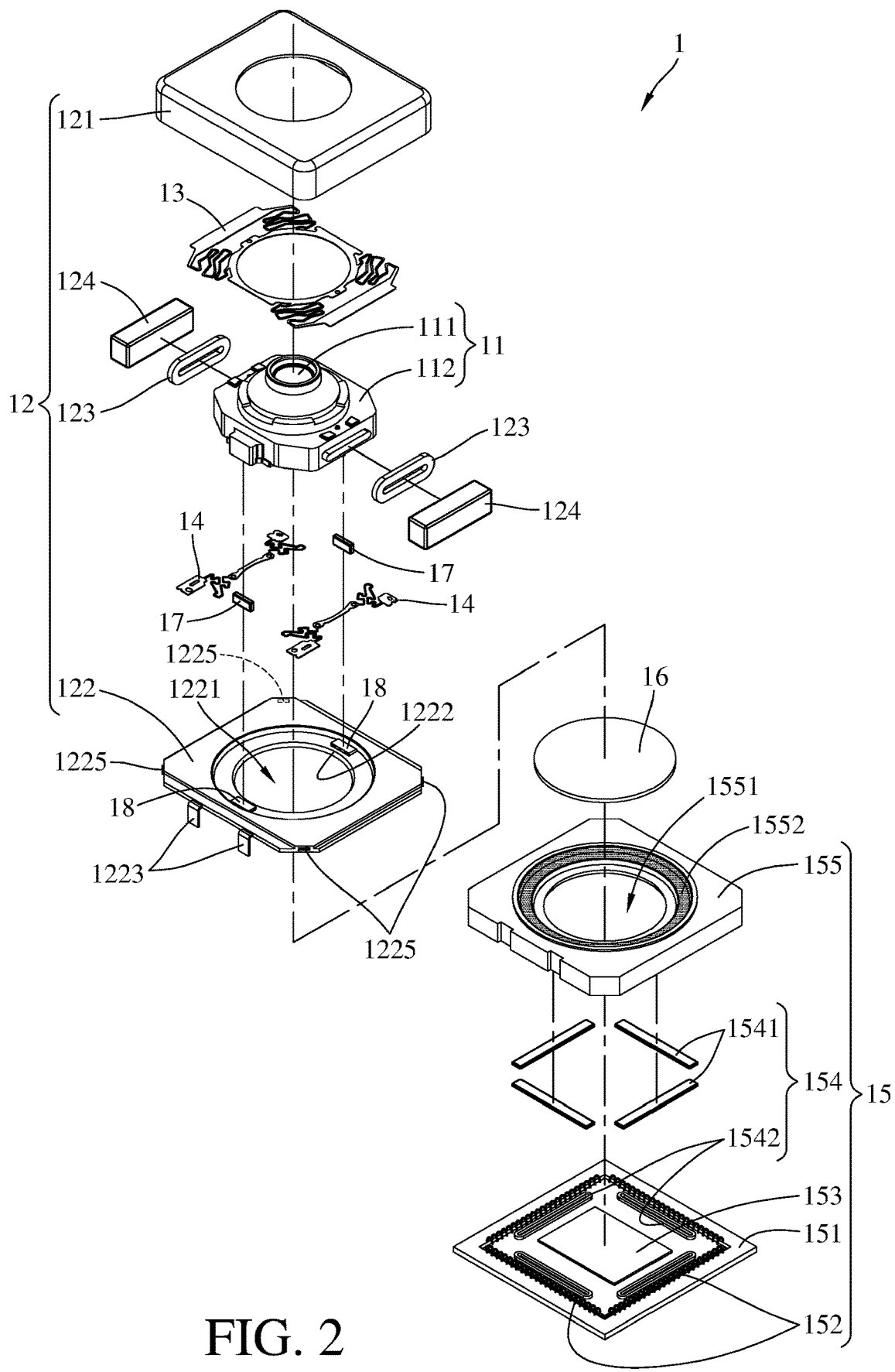
FIG. 2 is an exploded view of the camera module of FIG. 1.
Figure 3:
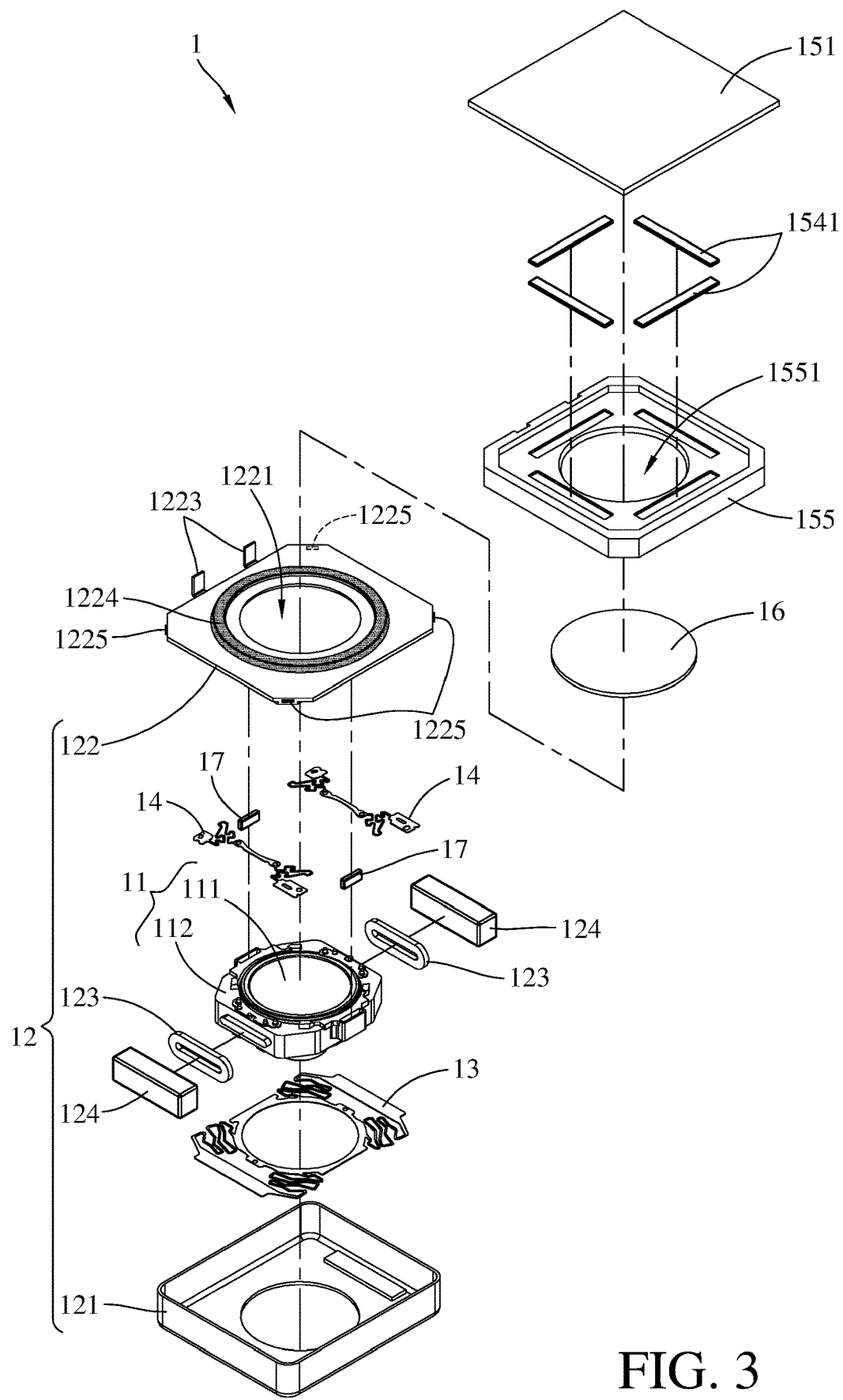
FIG. 3 is another exploded view of the camera module of FIG. 1.
Figure 4:
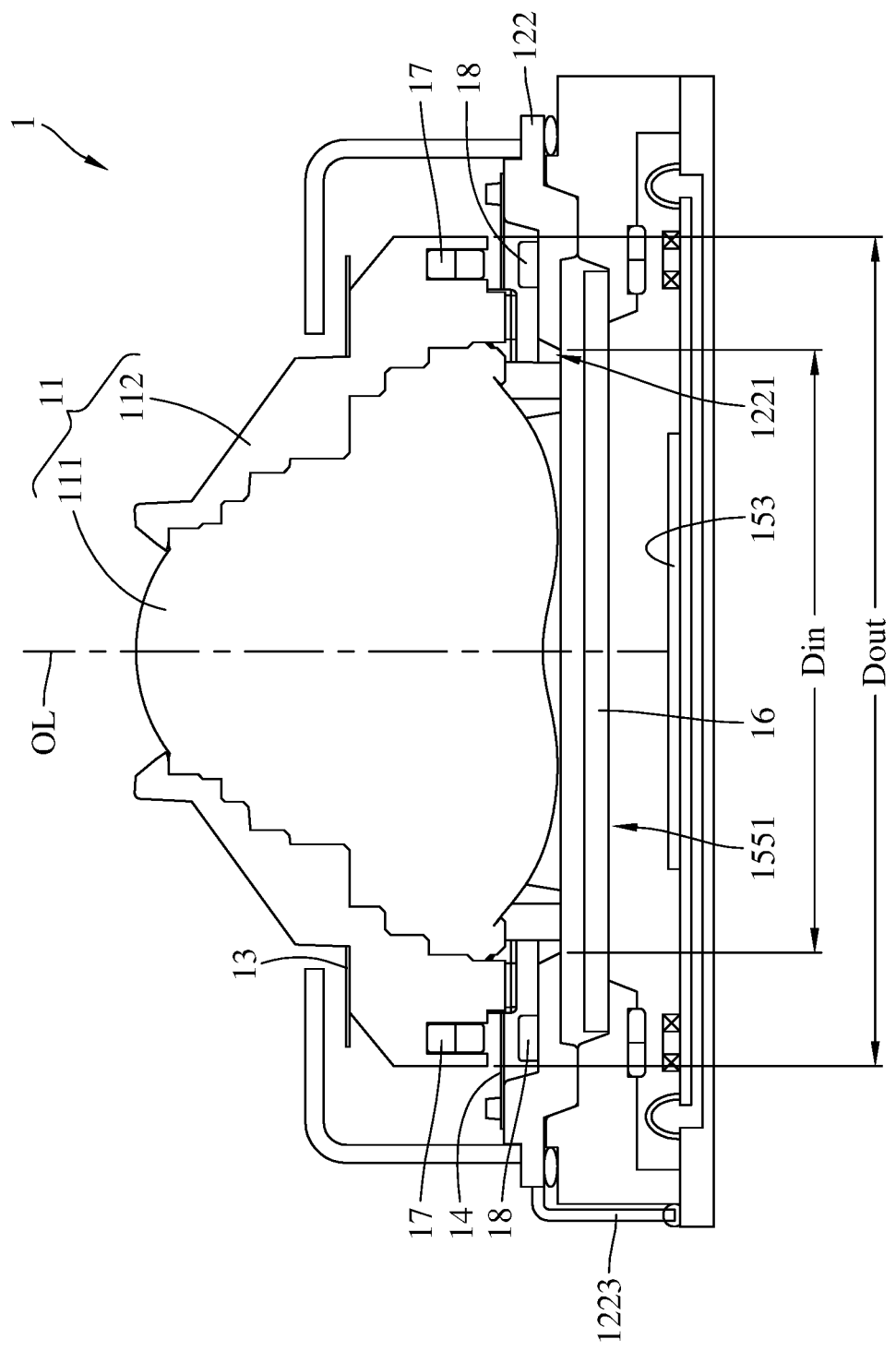
FIG. 4 is a cross-sectional view of the camera module along line 4-4' in FIG. 1.
Figure 5:
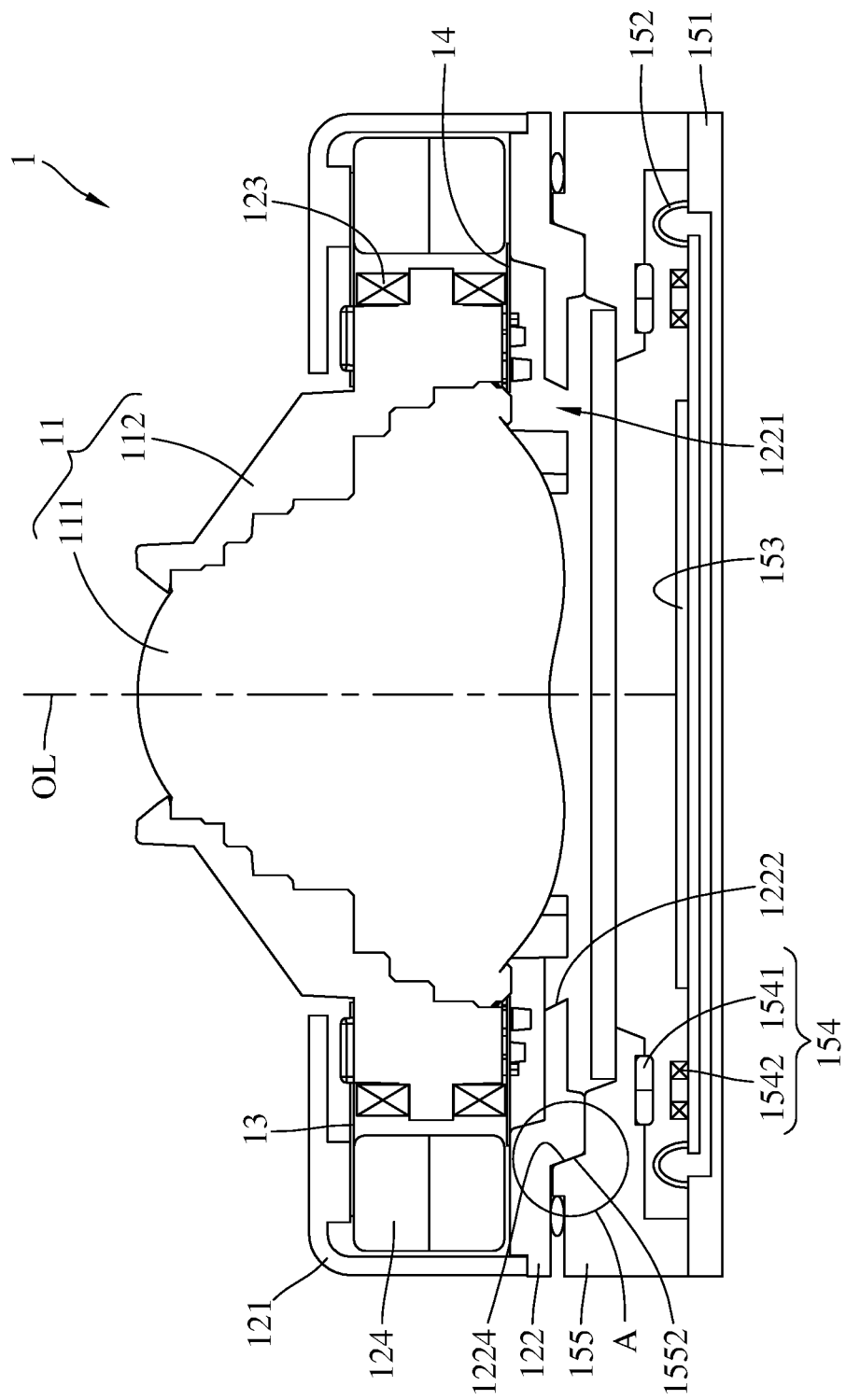
FIG. 5 is a cross-sectional view of the camera module along line 5-5' in FIG. 1.
Figure 6:
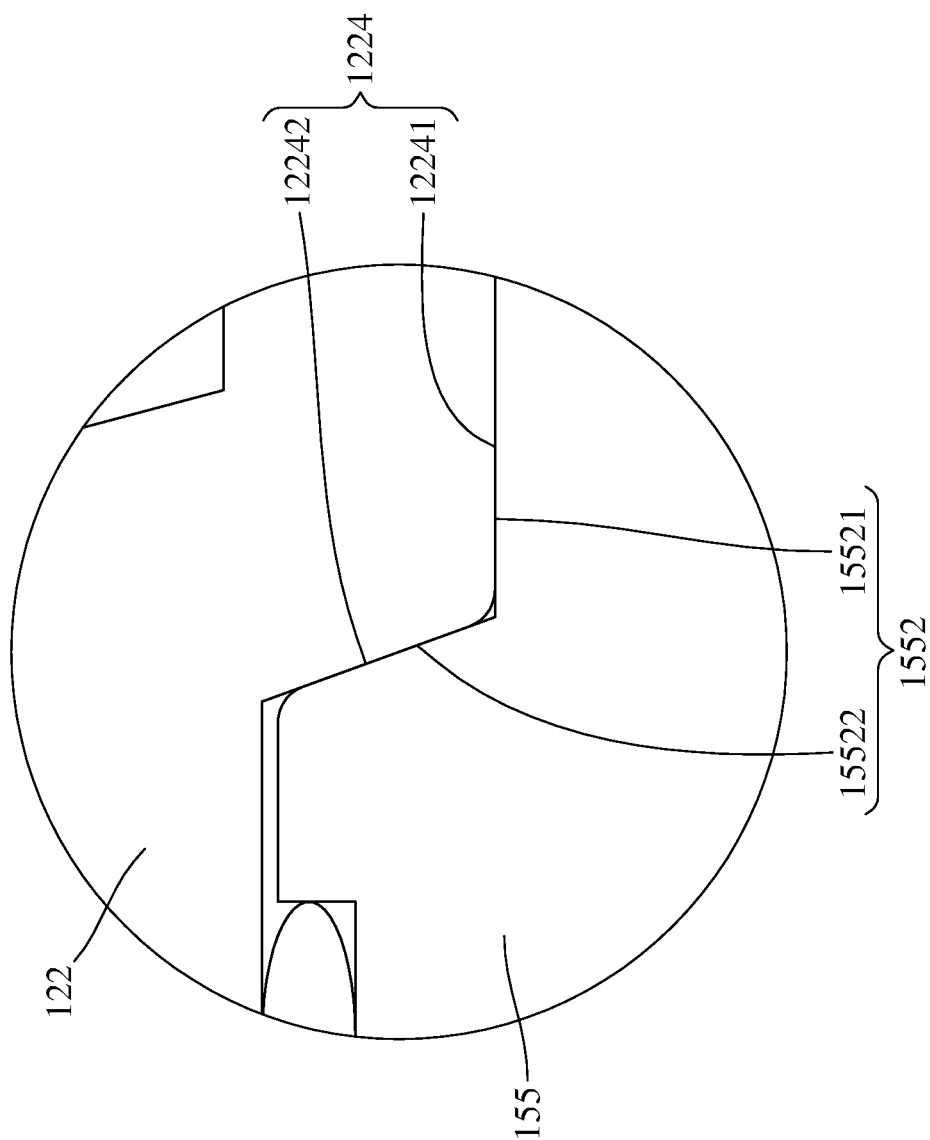
FIG. 6 is a partially enlarged view of region A of the camera module in FIG. 5.
Figure 7:
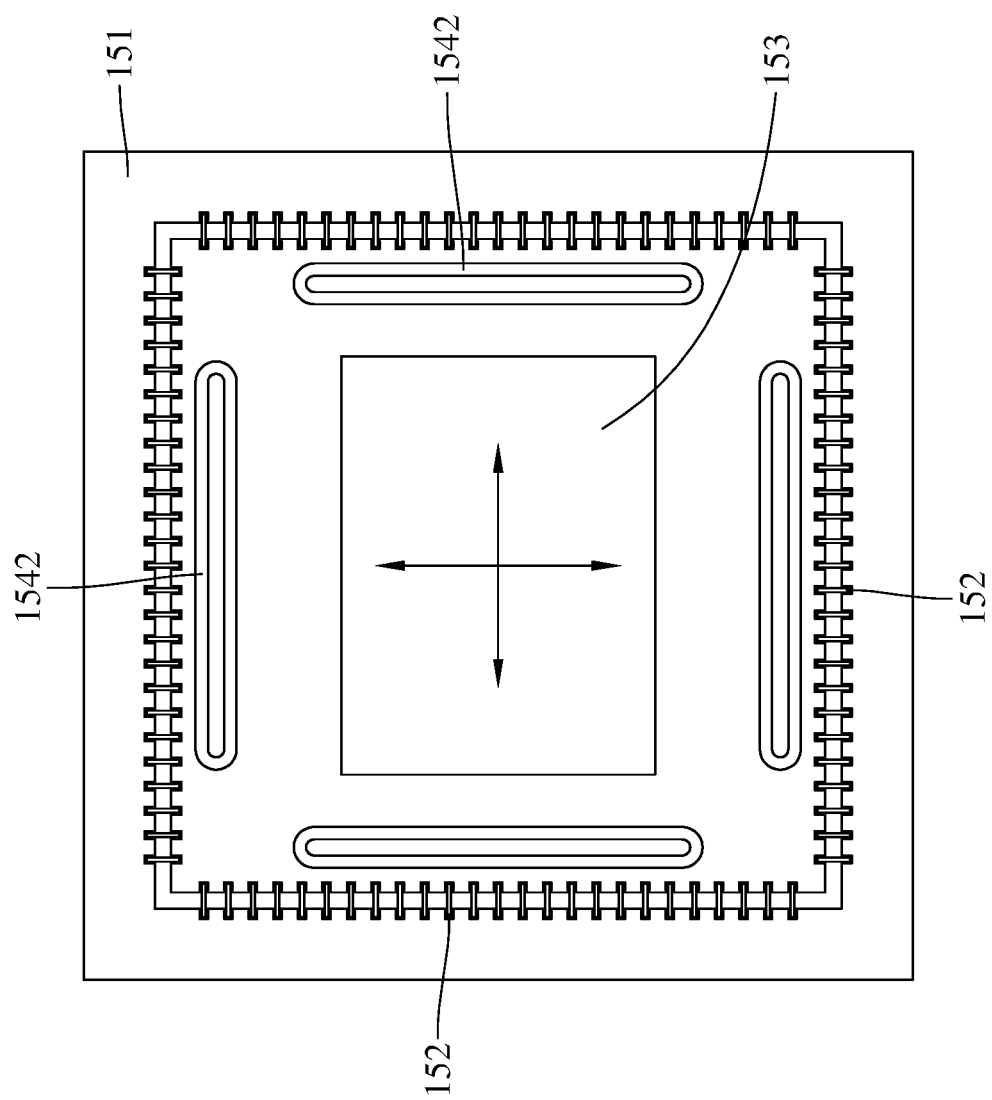
FIG. 7 is a top view of a part of the image sensor module in FIG. 2.

Please refer to FIG. 1 to FIG. 7, where FIG. 1 is a perspective view of a camera module according to the 1st embodiment of the present disclosure, FIG. 2 is an exploded view of the camera module of FIG. 1, FIG. 3 is another exploded view of the camera module of FIG. 1, FIG. 4 is a cross-sectional view of the camera module along line 4-4' in FIG. 1, FIG. 5 is a cross-sectional view of the camera module along line 5-5' in FIG. 1, FIG. 6 is a partially enlarged view of region A of the camera module in FIG. 5, and FIG. 7 is a top view of a part of the image sensor module in FIG. 2.

In this embodiment, a camera module 1 includes an imaging lens module 11, an axial driving device 12, an upper flat spring 13, two lower flat springs 14, an image sensor module 15, a filter 16, two position sensing magnets 17 and two position sensors 18.

The imaging lens module 11 includes at least one optical imaging lens element 111 and a unitary member 112, and the imaging lens module 11 has an optical axis OL. The at least one optical imaging lens element 111 is disposed in the unitary member 112, and the unitary member 112 is a threadless plastic member made by injection molding.

The axial driving device 12 is configured to drive the at least one optical imaging lens element 111 to move in a direction parallel to the optical axis OL, and the axial driving device 12 includes a casing 121, a base 122, two driving coils 123 and two driving magnets 124.

The base 122 is connected to the casing 121, and the base 122 has a through hole 1221 and an inner inclined surface 1222 surrounding the through hole 1221. In addition, the base 122 further has four gate traces 1225 respectively located at four chamfered corners of the base 122.

The unitary member 112 of the imaging lens module 11 is movably disposed between the casing 121 and the base 122 of the axial driving device 12, such that the at least one optical imaging lens element 111 is disposed in the casing 121. The optical axis OL of the imaging lens module 11 passes through the geometric center of the through hole 1221 of the base 122. Furthermore, the unitary member 112 is movably disposed between the casing 121 and the base 122 via the upper flat spring 13 and the lower flat springs 14. In detail, the upper flat spring 13 and the lower flat springs 14 each include an inner fixed part, an outer fixed part and an elastic part connected to and located between the inner fixed part and the outer fixed part (their reference numerals are omitted). The inner fixed part of the upper flat spring 13 is fixed to the unitary member 112, and the outer fixed part of the upper flat spring 13 is fixed to the inside of the casing 121, so that the unitary member 112 is movable relative to the casing 121. Also, the inner fixed part of each lower flat spring 14 is fixed to the unitary member 112, and the outer fixed part of each lower flat spring 14 is fixed to the base 122, so that the unitary member 112 is movable relative to the base 122. In this embodiment, a minimum inner diameter Din of the through hole 1221 is smaller than a maximum outer diameter Dout of the imaging lens module 11.

The driving coils 123 are disposed at two opposite sides of the unitary member 112, and the driving magnets 124 are fixed to the inside of the casing 121 and respectively face the driving coils 123 in a direction perpendicular to the optical axis OL. In addition, the driving magnets 124 are symmetrically disposed about the optical axis OL, and the driving coils 123 are symmetrically disposed about the optical axis OL. Therefore, a driving force can be generated by an electromagnetic interaction between the driving magnets 124 and the driving coils 123 to drive the unitary member 112 to move in a direction parallel to the optical axis OL. In this embodiment, the two groups of corresponding driving magnets 124 and driving coils 123 of the axial driving device 12 are respectively disposed on two opposite sides of the imaging lens module 11 to together generate a resultant force in a direction parallel to the optical axis OL exerted on the unitary member 112 of the imaging lens module 11 so as to drive the unitary member 112 along with the at least one optical imaging lens element 111 therein to move in a direction parallel to the optical axis OL.

The image sensor module 15 is disposed on an image side of the axial driving device 12, and the image sensor module 15 includes a printed circuit board (PCB) 151, a plurality of elastic wires 152, an image sensor 153, an image stabilizer 154 and a substrate 155.

The image sensor 153 is configured to convert light passing through the imaging lens module 11 into an image signal. In this embodiment, the image sensor 153 is disposed on the PCB 151 via the elastic wires 152, so that the image sensor 153 is movable relative to the PCB 151; that is, the elastic wires 152 can provide the image sensor 153 a degree of freedom of movement perpendicular to the optical axis OL. In addition, the elastic wires 152 are also configured to transmit an electrical signal of the image sensor 153.

The image stabilizer 154 is configured to drive the image sensor 153 to move in at least one direction that is perpendicular to the optical axis OL. In this embodiment, the image stabilizer 154 is a VCM including four stabilizing magnets 1541 and four stabilizing coils 1542. The stabilizing magnets 1541 are disposed at one side of the substrate 155 facing the image sensor 153, and the stabilizing coils 1542 are disposed at one side of the image sensor 153 facing the substrate 155. The stabilizing magnets 1541 respectively face one of the stabilizing coils 1542 in a direction parallel to the optical axis OL. As shown in FIG. 7, the four stabilizing coils 1542 are distributed around the image sensor 153, and a driving force in a direction perpendicular to the optical axis OL (as indicated by the arrow in FIG. 7) exerted on the stabilizing coils 1542 can be generated by an electromagnetic interaction between the stabilizing coils 1542 and the stabilizing magnets 1541 to drive the stabilizing coils 1542 along with the image sensor 153 to move in a direction perpendicular to the optical axis OL.

The substrate 155 is fixed to the PCB 151 and faces the axial driving device 12, and the substrate 155 and the base 122 of the axial driving device 12 are abutted against each other. In addition, the substrate 155 has an opening 1551 exposing the image sensor 153 on the PCB 151, so that light passing through the imaging lens module 11 can travel into the image sensor 153. In this embodiment, the base 122 of the axial driving device 12 includes two terminal parts 1223 extending towards the substrate 155 of the image sensor module 15 in a direction parallel to the optical axis OL, and the terminal parts 1223 are soldered to the substrate 155 and configured to provide a driving signal to the axial driving device 12.

The base 122 of the axial driving device 12 has a first axial assembling structure 1224, and the substrate 155 of the image sensor module 15 has a second axial assembling structure 1552. The shape of the first axial assembling structure 1224 and the shape of the second axial assembling structure 1552 are annular. The first axial assembling structure 1224 is abutted against the second axial assembling structure 1552, so that the imaging lens module 11 is aligned with the image sensor module 15 in a direction along the optical axis OL. In addition, the first axial assembling structure 1224 is located at a bottom of the base 122 facing the image sensor module 15, and the first axial assembling structure 1224 protrudes from the bottom towards the image sensor module 15; the second axial assembling structure 1552 is located at a top of the substrate 155 facing the axial driving device 12, and the second axial assembling structure 1552 is recessed from the top of the substrate 155 in a direction away from the axial driving device 12.

As shown in FIG. 6, the first axial assembling structure 1224 includes a plane surface 12241 and an inclined surface 12242 connected to each other and forming an angle therebetween, and the second axial assembling structure 1552 includes a plane surface 15521 and an inclined surface 15522 connected to each other and forming an angle therebetween. The plane surface 12241 and the inclined surface 12242 of the first axial assembling structure 1224 are respectively abutted against the plane surface 15521 and the inclined surface 15522 of the second axial assembling structure 1552. In addition, the plane surface 12241 and the plane surface 15521 are substantially perpendicular to the optical axis OL so as to space apart the imaging lens module 11 and the image sensor 153 and prevent the imaging lens module 11 from tilting. The inclined surface 12242 and the inclined surface 15522 are configured to align the optical axis OL of the imaging lens module 11 with the geometric center of the image sensor 153. Moreover, the inclined surface 15522 of the second axial assembling structure 1552 surrounds the inclined surface 12242 of the first axial assembling structure 1224.

In this embodiment, the optical axis OL passes through the center of the first axial assembling structure 1224 and the center of the second axial assembling structure 1552, and the first axial assembling structure 1224 and the second axial assembling structure 1552 surround the through hole 1221 of the base 122. The first axial assembling structure 1224 is axisymmetric about the optical axis OL, and the second axial assembling structure 1552 is axisymmetric about the optical axis OL. In addition, the surfaces of the first axial assembling structure 1224 and the second axial assembling structure 1552 are smooth surfaces.

In this embodiment, an area surrounded by the inner inclined surface 1222 of the base 122 tapers off towards the image sensor module 15 along the optical axis OL, so that the through hole 1221 of the base 122 forms a tip-end aperture; that is, the tip-end aperture tapers off towards the image sensor module 15 in a direction parallel to the optical axis OL.

The filter 16 is disposed on the substrate 155 and covers the opening 1551 of the substrate 155. The filter 16 is located between the imaging lens module 11 and the image sensor 153 and configured to filter specific wavelengths of incident light. In this embodiment, the substrate 155 is also used as a support frame for carrying the filter 16.

The position sensing magnets 17 are disposed on the unitary member 112, and the position sensors 18 are disposed on the base 122 of the axial driving device 12. The position sensors 18 respectively correspond to the position sensing magnets 17 so as to detect a position of the imaging lens module 11.

2nd Embodiment

Figure 8:
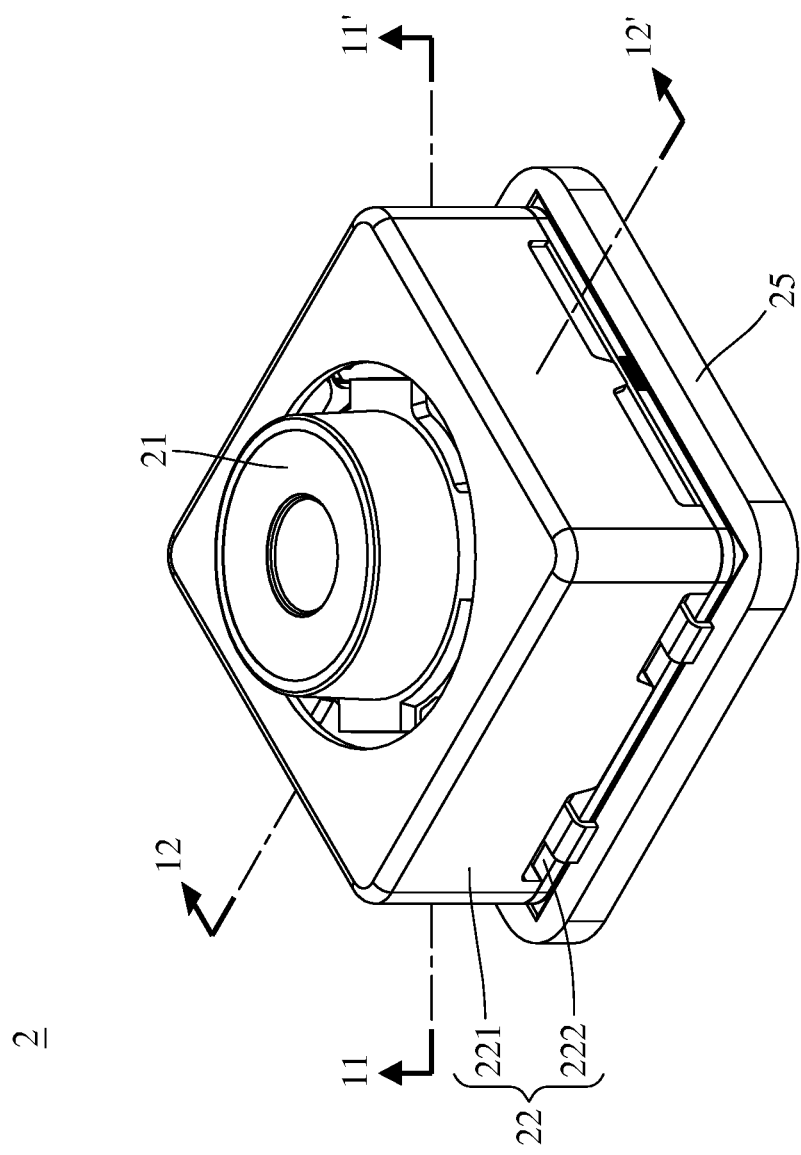
FIG. 8 is a perspective view of a camera module according to the 2nd embodiment of the present disclosure.
Figure 9:
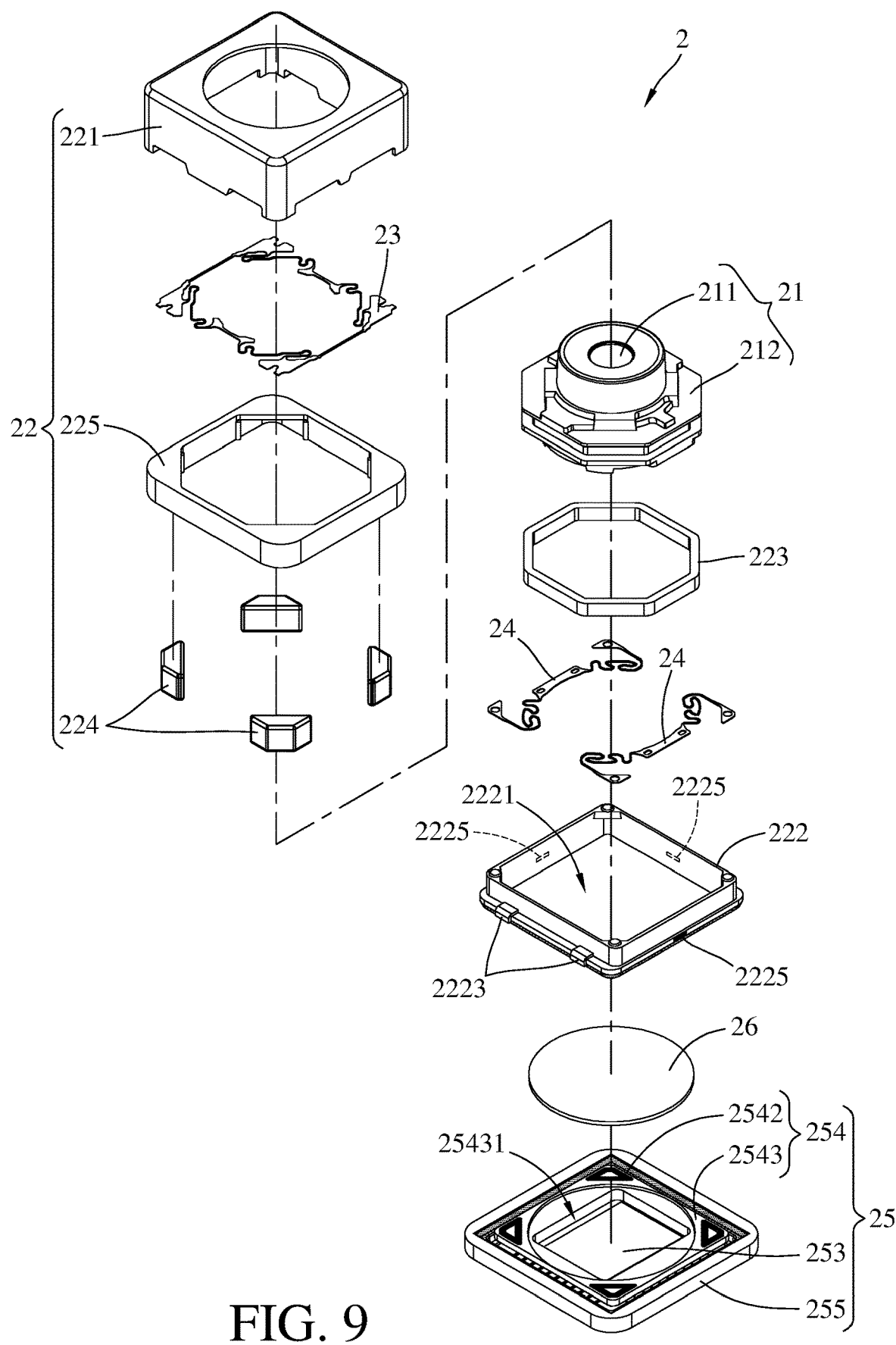
FIG. 9 is an exploded view of the camera module of FIG. 8.
Figure 10:
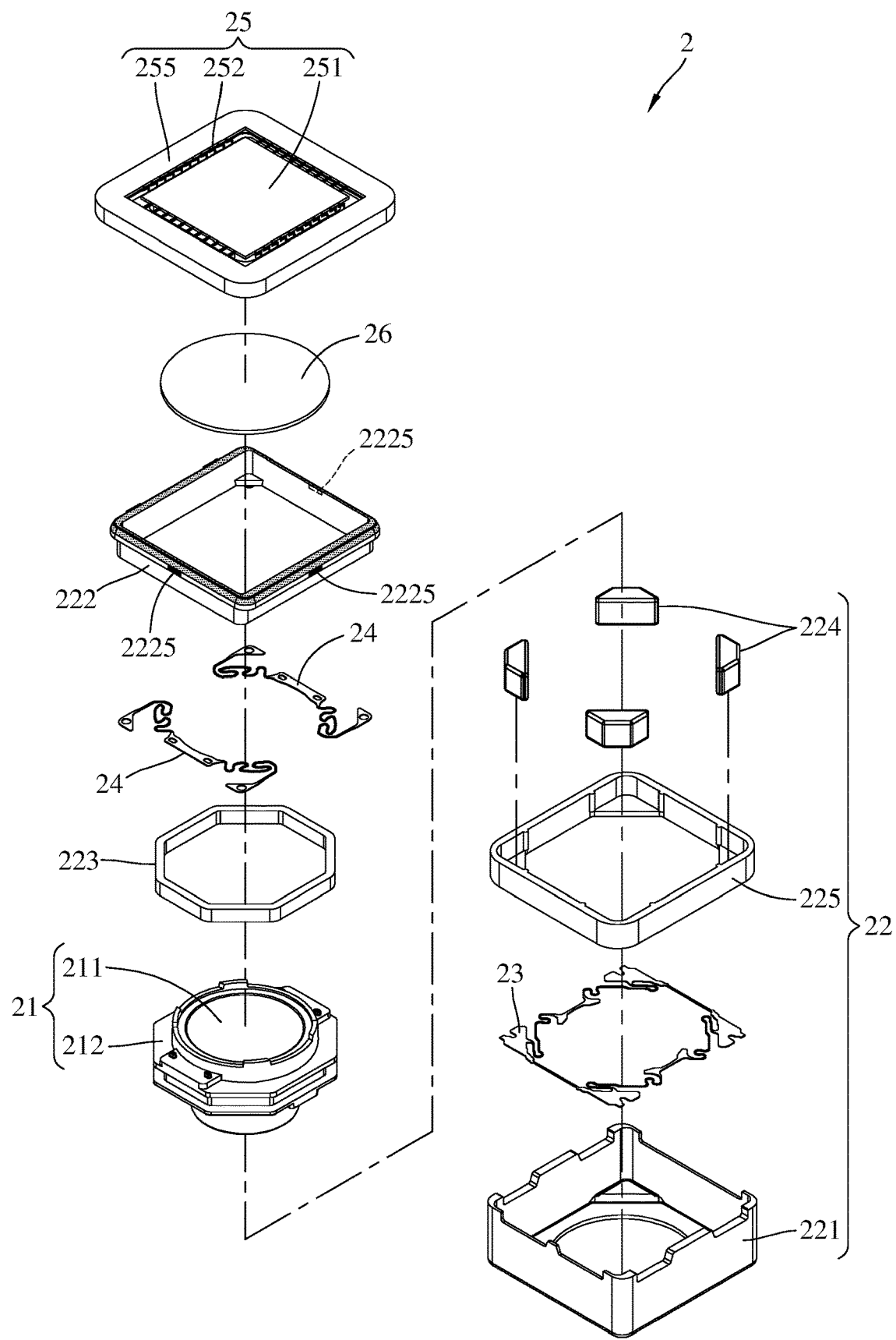
FIG. 10 is another exploded view of the camera module of FIG. 8.
Figure 11:
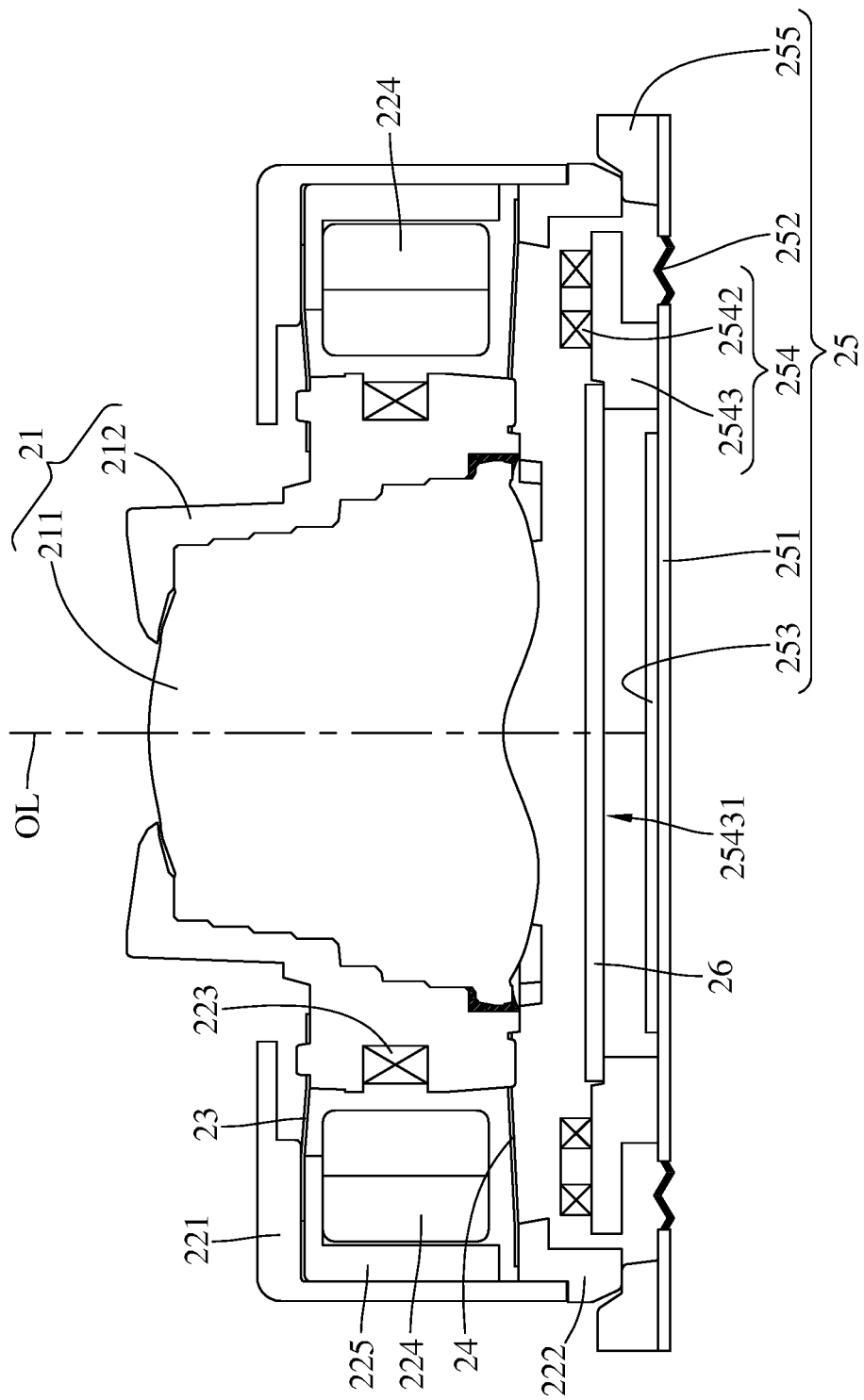
FIG. 11 is a cross-sectional view of the camera module along line 11-11' in FIG. 8.
Figure 12:
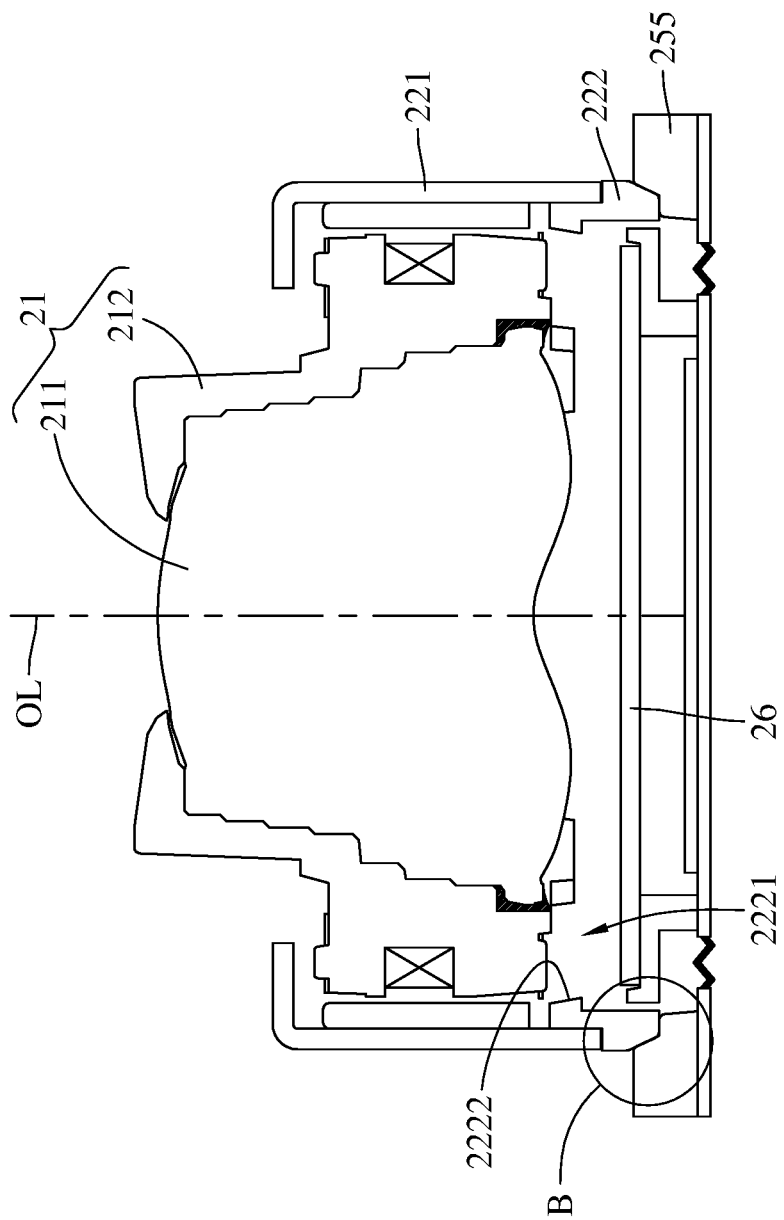
FIG. 12 is a cross-sectional view of the camera module along line 12-12' in FIG. 8.
Figure 13:
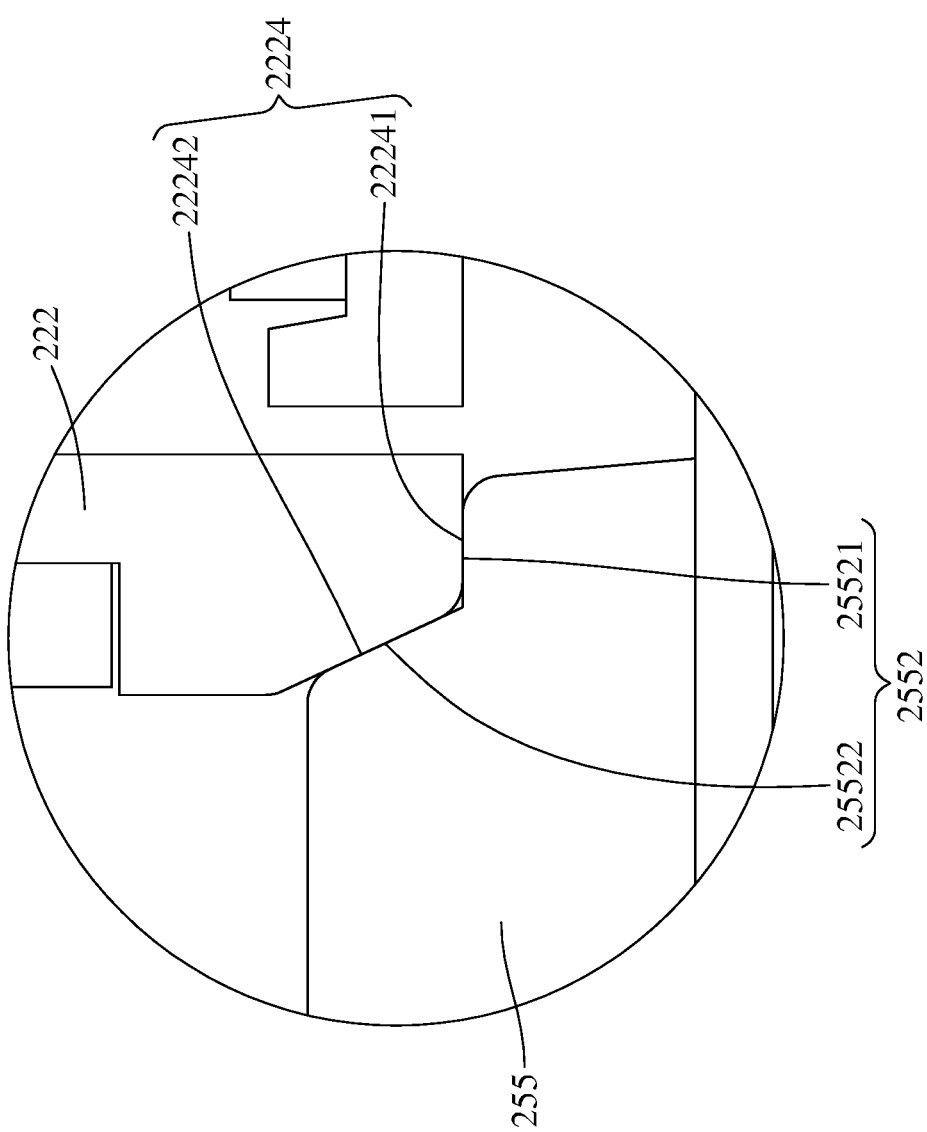
FIG. 13 is a partially enlarged view of region B of the camera module in FIG. 12.
Figure 14:
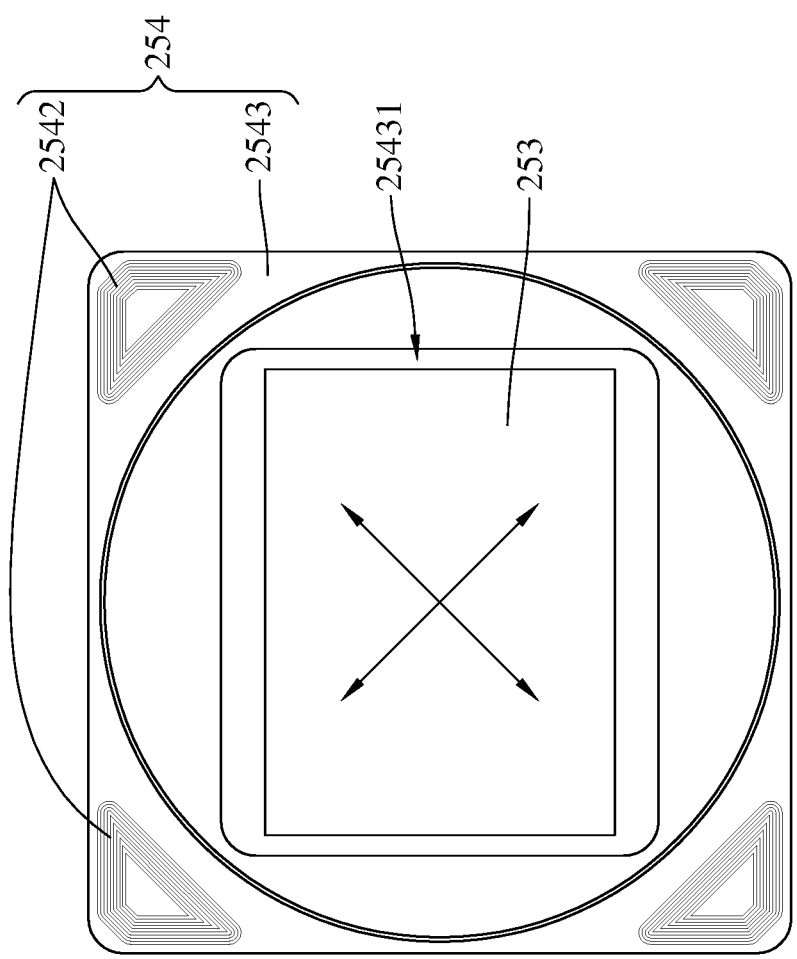
FIG. 14 is a top view of the image stabilizer and the image sensor in FIG. 9.
Figure 15:
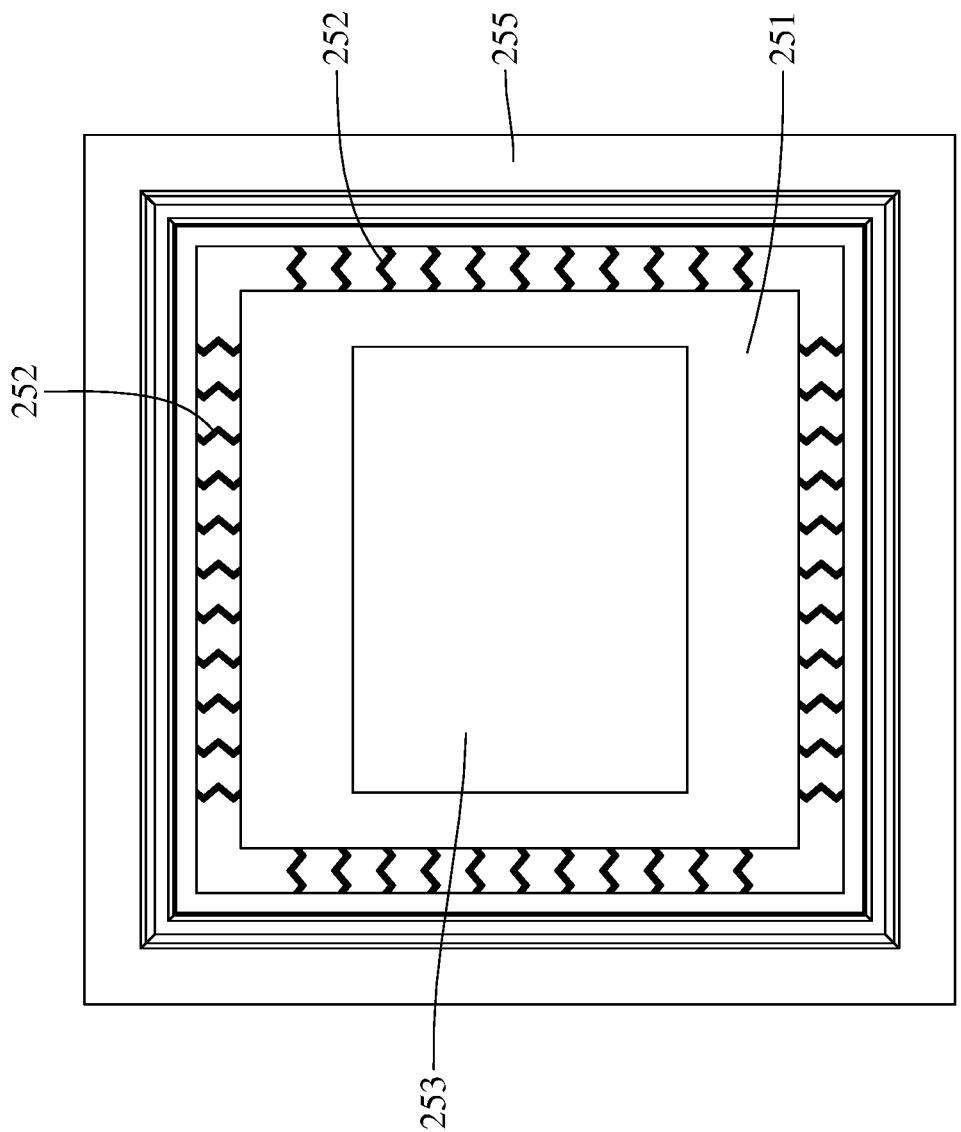
FIG. 15 is a top view of the image sensor, the PCB, the elastic wires, and the substrate in FIG. 9.

Please refer to FIG. 8 to FIG. 15, where FIG. 8 is a perspective view of a camera module according to the 2nd embodiment of the present disclosure, FIG. 9 is an exploded view of the camera module of FIG. 8, FIG. 10 is another exploded view of the camera module of FIG. 8, FIG. 11 is a cross-sectional view of the camera module along line 11-11' in FIG. 8, FIG. 12 is a cross-sectional view of the camera module along line 12-12' in FIG. 8, FIG. 13 is a partially enlarged view of region B of the camera module in FIG. 12, FIG. 14 is a top view of the image stabilizer and the image sensor in FIG. 9, and FIG. 15 is a top view of the image sensor, the PCB, the elastic wires, and the substrate in FIG. 9.

In this embodiment, a camera module 2 includes an imaging lens module 21, an axial driving device 22, an upper flat spring 23, two lower flat springs 24, an image sensor module 25 and a filter 26.

The imaging lens module 21 includes at least one optical imaging lens element 211 and a unitary member 212, and the imaging lens module 21 has an optical axis OL. The at least one optical imaging lens element 211 is disposed in the unitary member 212, and the unitary member 212 is a threadless plastic member made by injection molding.

The axial driving device 22 is configured to drive the at least one optical imaging lens element 211 to move in a direction parallel to the optical axis OL, and the axial driving device 22 includes a casing 221, a base 222, a magnet carrier 225, a driving coil 223 and four driving magnets 224.

The base 222 is connected to the casing 221, and the base 222 has a through hole 2221 and an inner inclined surface 2222 surrounding the through hole 2221. The magnet carrier 225 is fixed to the inside of the casing 221 for the driving magnets 224 to be disposed thereon. In addition, the base 222 further has three gate traces 2225 located on an outer surface of a bottom of the base 222.

The unitary member 212 of the imaging lens module 21 is movably disposed between the casing 221 and the base 222 of the axial driving device 22, such that the at least one optical imaging lens element 211 is disposed in the casing 221. The optical axis OL of the imaging lens module 21 passes through the geometric center of the through hole 2221 of the base 222. Furthermore, the unitary member 212 is movably disposed between the casing 221 and the base 222 via the upper flat spring 23 and the lower flat springs 24. In detail, the upper flat spring 23 and the lower flat springs 24 each include an inner fixed part, an outer fixed part and an elastic part connected to and located between the inner fixed part and the outer fixed part (their reference numerals are omitted). The inner fixed part of the upper flat spring 23 is fixed to the unitary member 212, and the outer fixed part of the upper flat spring 23 is fixed to the inside of the casing 221, so that the unitary member 212 is movable relative to the casing 221. Also, the inner fixed part of each lower flat spring 24 is fixed to the unitary member 212, and the outer fixed part of each lower flat spring 24 is fixed to the base 222, so that the unitary member 212 is movable relative to the base 222.

The driving coil 223 is a ring-shaped coil surrounding and coupled to the unitary member 212. The driving magnets 224 are fixed to the magnet carrier 225 and together surround the unitary member 212, and the driving magnets 224 face the driving coil 223 in a direction perpendicular to the optical axis OL. In addition, the driving magnets 224 are symmetrically disposed about the optical axis OL, and the driving coil 223 is symmetrically disposed about the optical axis OL. Therefore, a driving force can be generated by an electromagnetic interaction between the driving magnets 224 and the driving coil 223 to drive the unitary member 212 to move in a direction parallel to the optical axis OL. In this embodiment, the four driving magnets 224 are evenly distributed around the unitary member 212 to together generate a resultant force in a direction parallel to the optical axis OL exerted on the unitary member 212 of the imaging lens module 21 so as to drive the unitary member 212 along with the at least one optical imaging lens element 211 therein to move in a direction parallel to the optical axis OL.

In this embodiment, as shown in FIG. 11, the outer fixed part of the upper flat spring 23 is clamped by and fixed between the casing 221 and the magnet carrier 225.

The image sensor module 25 is disposed on an image side of the axial driving device 22, and the image sensor module 25 includes a substrate 255, a PCB 251, an image sensor 253, a plurality of elastic wires 252 and an image stabilizer 254.

The substrate 255 faces the axial driving device 22, and the substrate 255 and the base 222 of the axial driving device 22 are abutted against each other. In this embodiment, the base 222 of the axial driving device 22 includes two terminal parts 2223 extending towards the substrate 255 of the image sensor module 25 in a direction parallel to the optical axis OL, and the terminal parts 2223 are soldered to the substrate 255 and configured to provide a driving signal to the axial driving device 22.

The image sensor 253 is disposed on the PCB 251 and configured to convert light passing through the imaging lens module 21 into an image signal. In this embodiment, the PCB 251 is connected to and disposed on the substrate 255 via the elastic wires 252, so that the image sensor 253 is movable relative to the substrate 255; that is, the elastic wires 252 can provide the image sensor 253 a degree of freedom of movement perpendicular to the optical axis OL. In addition, the elastic wires 252 are also configured to transmit an electrical signal of the image sensor 253.

The image stabilizer 254 is configured to drive the image sensor 253 to move in at least one direction that is perpendicular to the optical axis OL. The image stabilizer 254 includes a coil carrier 2543 and four stabilizing coils 2542. The coil carrier 2543 is fixed to the PCB 251, and the stabilizing coils 2542 are disposed on the coil carrier 2543. As shown in FIG. 9 and FIG. 14, the four stabilizing coils 2542 are distributed around the coil carrier 2543 and respective correspond to one of the driving magnets 224 of the axial driving device 22 in a direction perpendicular to the optical axis OL. In this embodiment, a driving force in a direction perpendicular to the optical axis OL (as indicated by the arrow in FIG. 14) exerted on the stabilizing coils 2542 can be generated by an electromagnetic interaction between the stabilizing coils 2542 and the driving magnets 224 of the axial driving device 22 to drive the stabilizing coils 2542 along with the coil carrier 2543, the PCB 251 and the image sensor 253 to move in a direction perpendicular to the optical axis OL.

In this embodiment, the coil carrier 2543 has an opening 25431 exposing the image sensor 253 on the PCB 251, so that light passing through the imaging lens module 21 can travel into the image sensor 253.

The base 222 of the axial driving device 22 has a first axial assembling structure 2224, and the substrate 255 of the image sensor module 25 has a second axial assembling structure 2552. The shape of the first axial assembling structure 2224 and the shape of the second axial assembling structure 2552 are rectangular. The first axial assembling structure 2224 is abutted against the second axial assembling structure 2552, so that the imaging lens module 21 is aligned with the image sensor module 25 in a direction along the optical axis OL. In addition, the first axial assembling structure 2224 is located at the bottom of the base 222 facing the image sensor module 25, and the first axial assembling structure 2224 protrudes from the bottom towards the image sensor module 25; the second axial assembling structure 2552 is located at a top of the substrate 255 facing the axial driving device 22, and the second axial assembling structure 2552 is recessed from the top of the substrate 255 in a direction away from the axial driving device 22.

As shown in FIG. 13, the first axial assembling structure 2224 includes a plane surface 22241 and an inclined surface 22242 connected to each other and forming an angle therebetween, and the second axial assembling structure 2552 includes a plane surface 25521 and an inclined surface 25522 connected to each other and forming an angle therebetween. The plane surface 22241 and the inclined surface 22242 of the first axial assembling structure 2224 are respectively abutted against the plane surface 25521 and the inclined surface 25522 of the second axial assembling structure 2552. In addition, the plane surface 22241 and the plane surface 25521 are substantially perpendicular to the optical axis OL so as to space apart the imaging lens module 21 and the image sensor 253 and prevent the imaging lens module 21 from tilting. The inclined surface 22242 and the inclined surface 25522 are configured to align the optical axis OL of the imaging lens module 21 with the geometric center of the image sensor 253. Moreover, the inclined surface 25522 of the second axial assembling structure 2552 surrounds the inclined surface 22242 of the first axial assembling structure 2224.

In this embodiment, the optical axis OL passes through the center of the first axial assembling structure 2224 and the center of the second axial assembling structure 2552, and the first axial assembling structure 2224 and the second axial assembling structure 2552 surround the through hole 2221 of the base 222. The first axial assembling structure 2224 is axisymmetric about the optical axis OL, and the second axial assembling structure 2552 axisymmetric about the optical axis OL. In addition, the surfaces of the first axial assembling structure 2224 and the second axial assembling structure 2552 are smooth surfaces.

In this embodiment, an area surrounded by the inner inclined surface 2222 of the base 222 tapers off towards the image sensor module 25 along the optical axis OL, so that the through hole 2221 of the base 222 forms a tip-end aperture; that is, the tip-end aperture tapers off towards the image sensor module 25 in a direction parallel to the optical axis OL.

The filter 26 is disposed on the coil carrier 2543 of the image stabilizer 254 and covers the opening 25431 of the coil carrier 2543. The filter 26 is located between the imaging lens module 21 and the image sensor 253 and configured to filter specific wavelengths of incident light. In this embodiment, the coil carrier 2543 is also used as a support frame for carrying the filter 26.

3rd Embodiment

Figure 16:
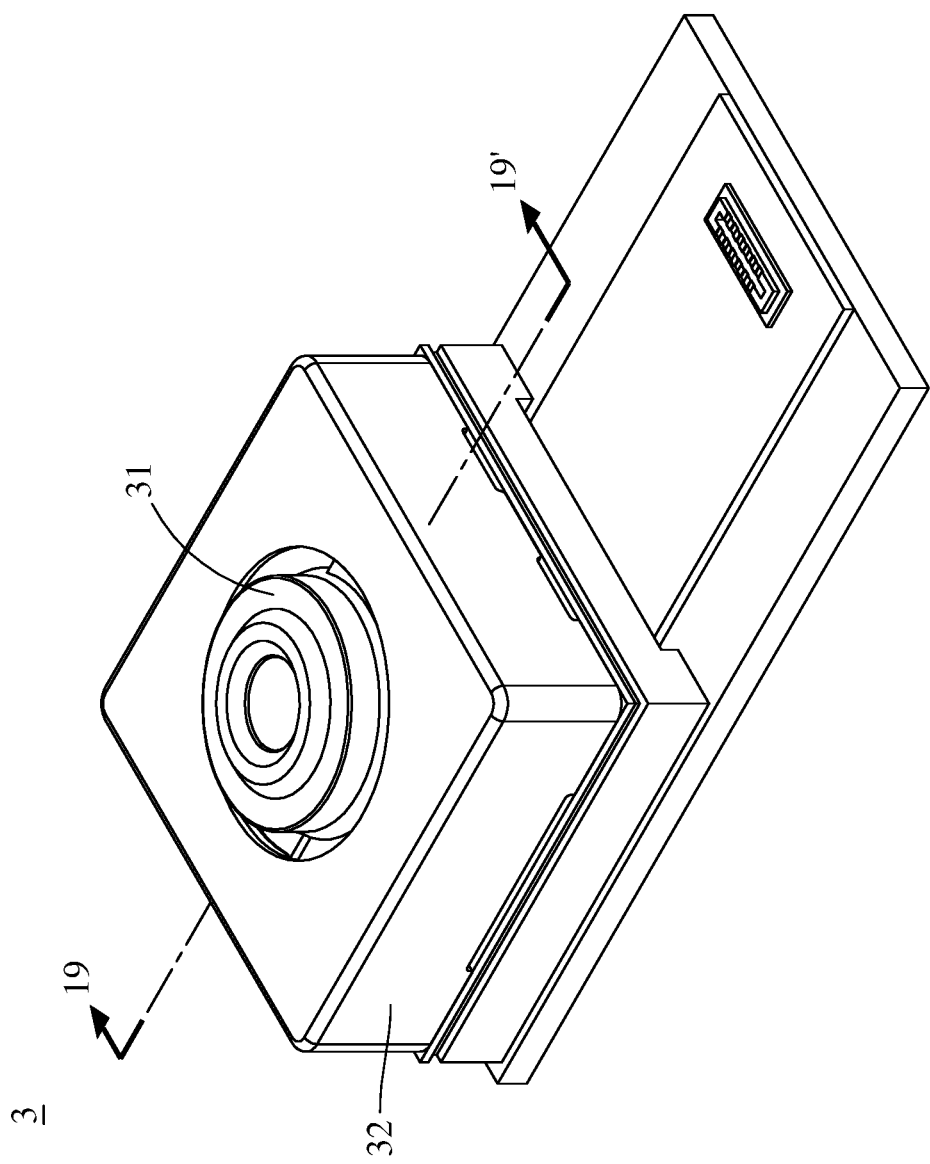
FIG. 16 is a perspective view of a camera module according to the 3rd embodiment of the present disclosure.
Figure 17:
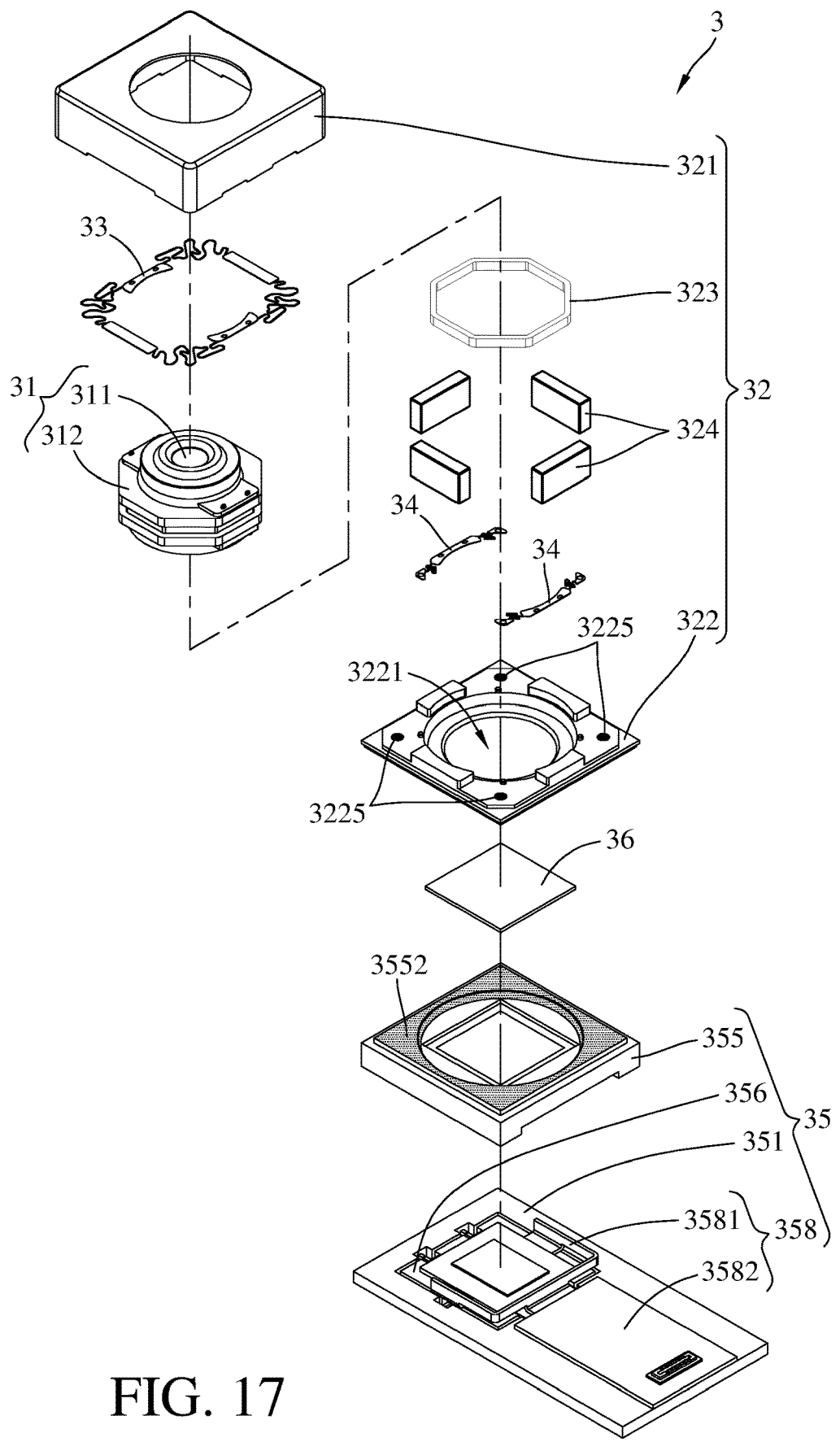
FIG. 17 is an exploded view of the camera module of FIG. 16.
Figure 18:
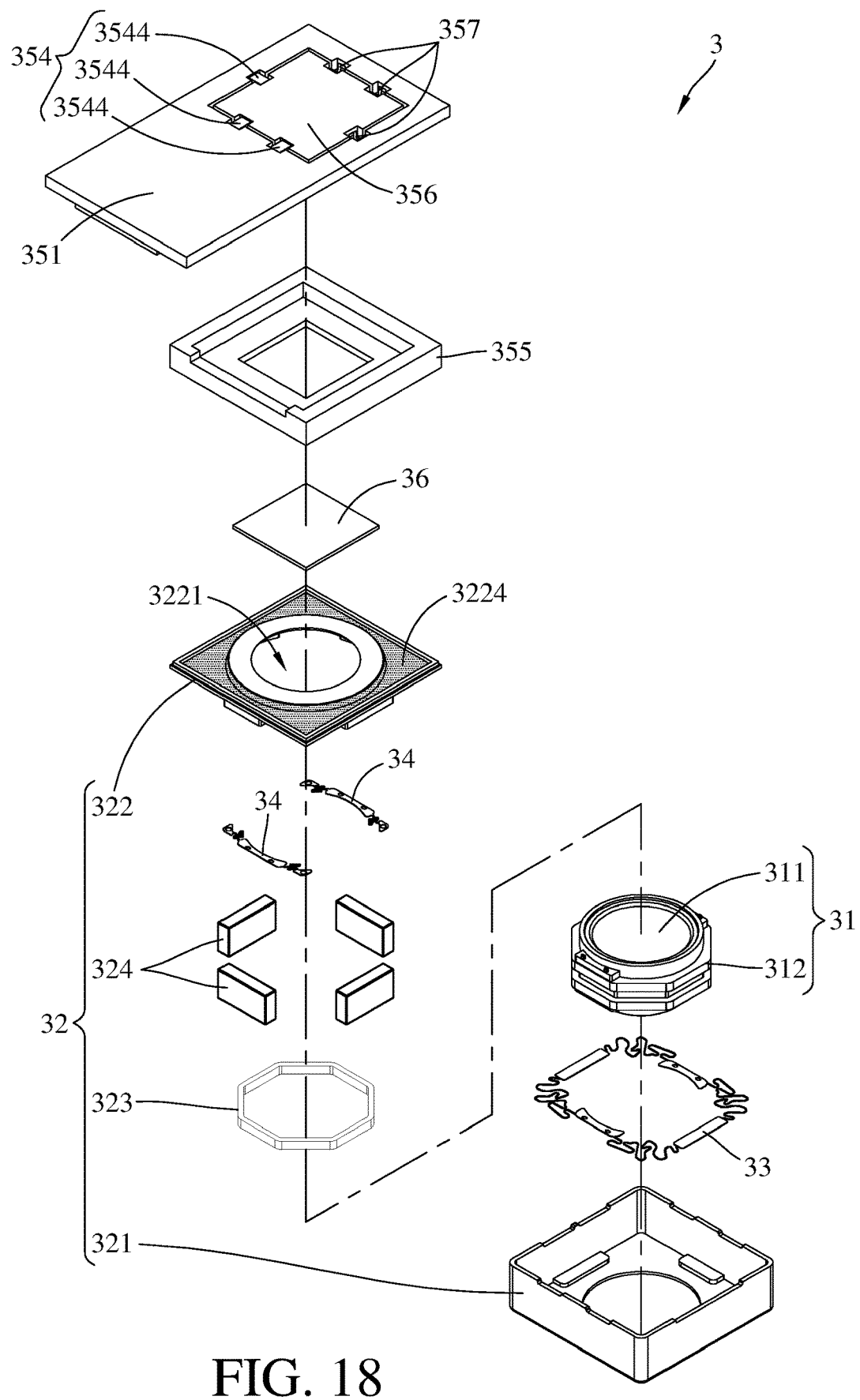
FIG. 18 is another exploded view of the camera module of FIG. 16.
Figure 19:
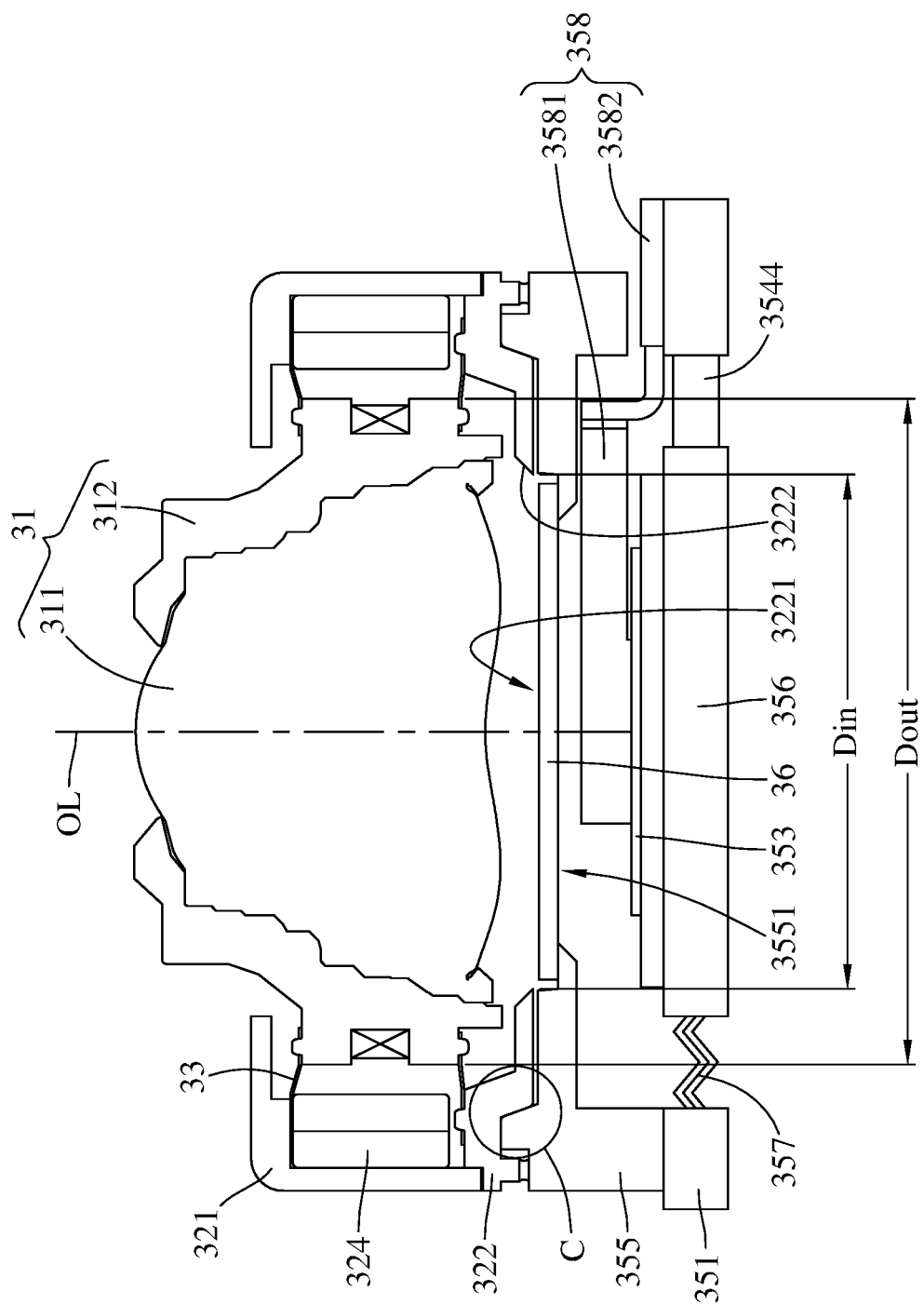
FIG. 19 is a cross-sectional view of the camera module along line 19-19' in FIG. 16.
Figure 20:
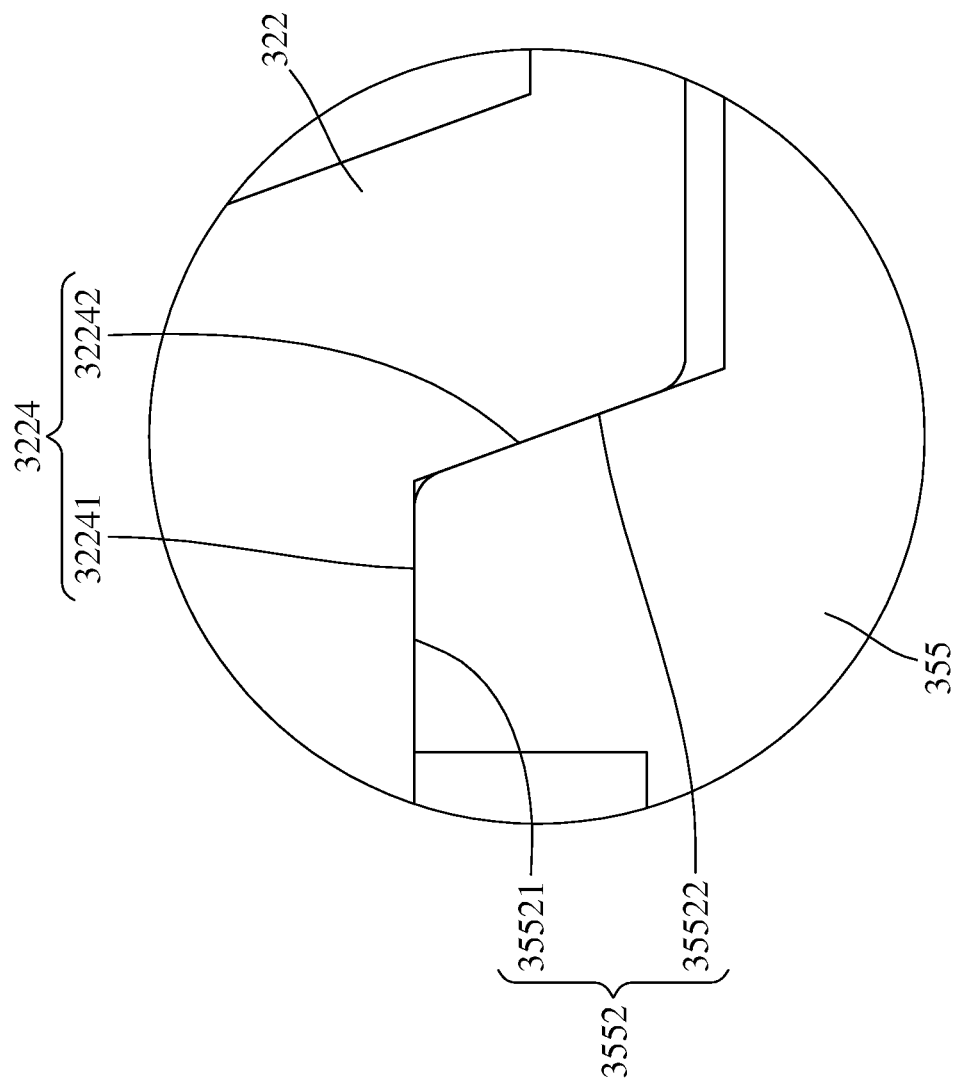
FIG. 20 is a partially enlarged view of region C of the camera module in FIG. 19.
Figure 21:
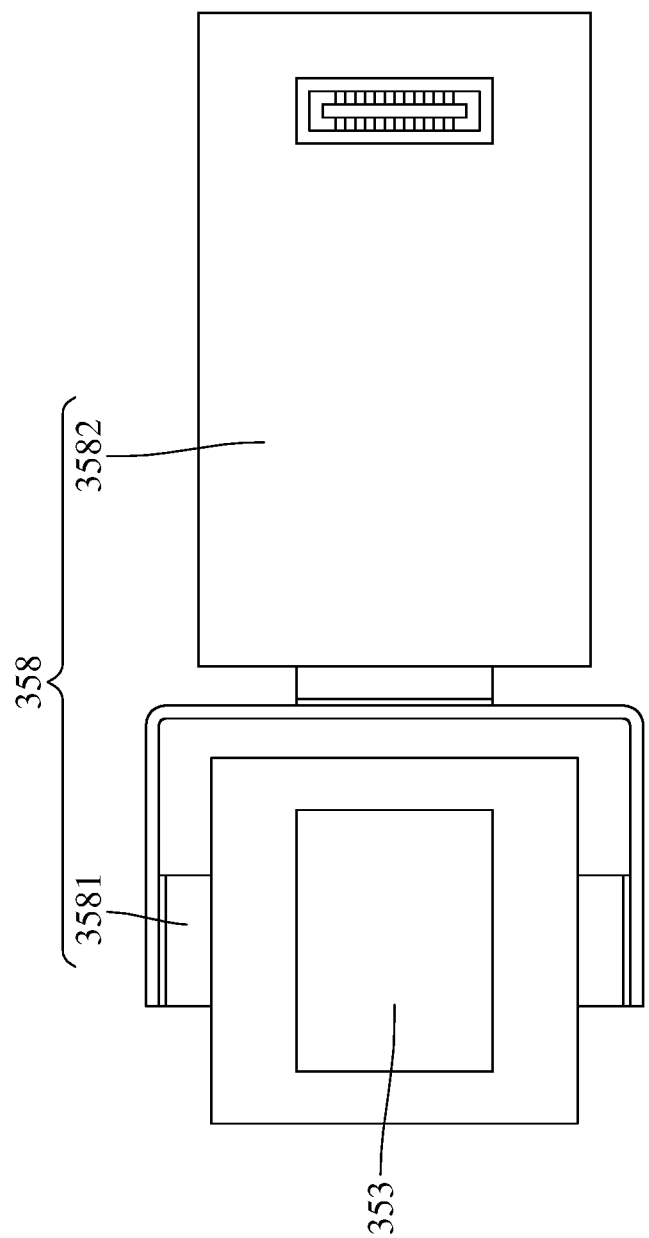
FIG. 21 is a top view of a part of the image sensor module in FIG. 16.
Figure 22:
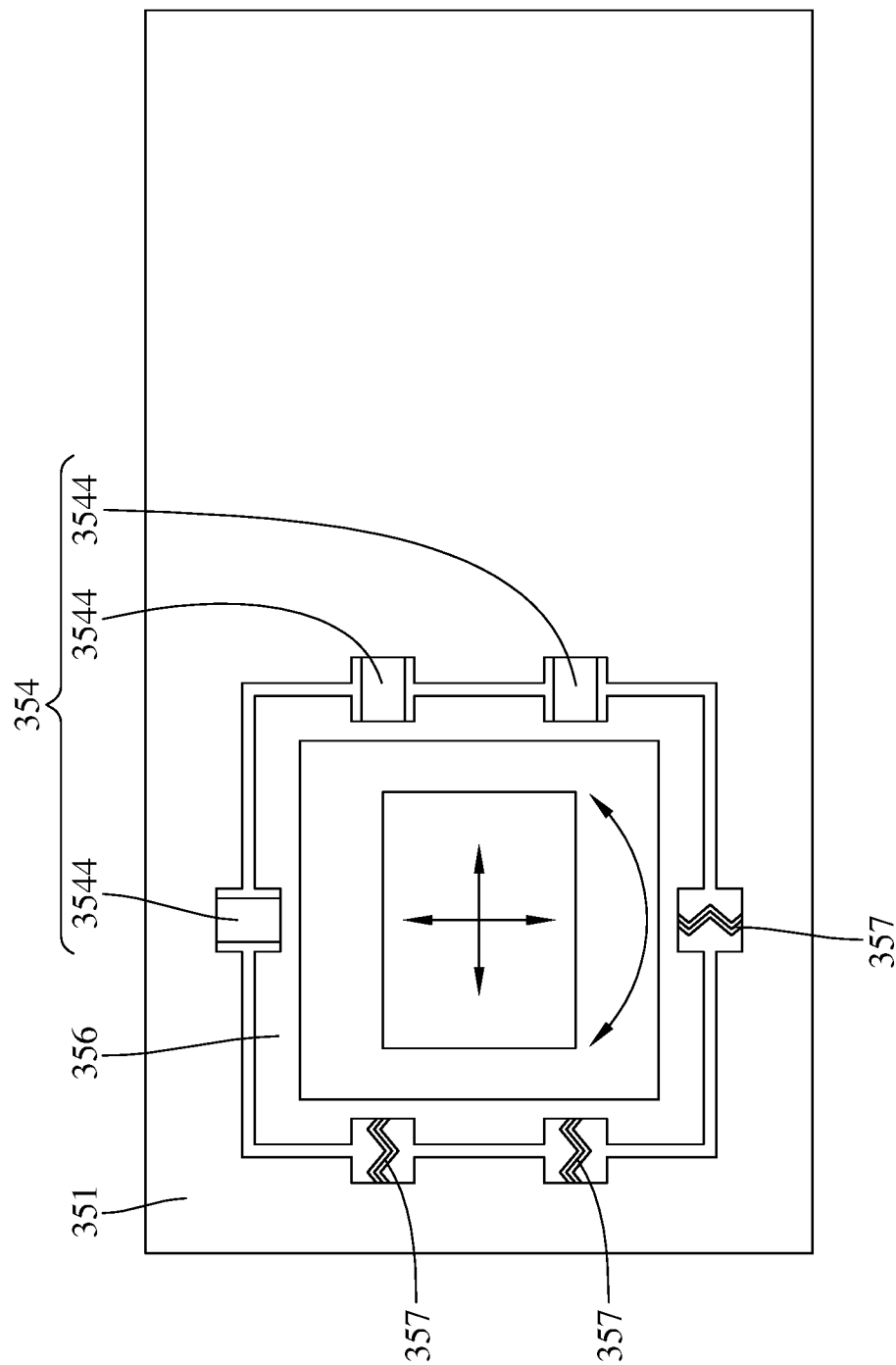
FIG. 22 is a bottom view of a part of the image sensor module in FIG. 16.

Please refer to FIG. 16 and FIG. 22, where FIG. 16 is a perspective view of a camera module according to the 3rd embodiment of the present disclosure, FIG. 17 is an exploded view of the camera module of FIG. 16, FIG. 18 is another exploded view of the camera module of FIG. 16, FIG. 19 is a cross-sectional view of the camera module along line 19-19' in FIG. 16, FIG. 20 is a partially enlarged view of region C of the camera module in FIG. 19, FIG. 21 is a top view of a part of the image sensor module in FIG. 16, and FIG. 22 is a bottom view of a part of the image sensor module in FIG. 16.

In this embodiment, a camera module 3 includes an imaging lens module 31, an axial driving device 32, an upper flat spring 33, two lower flat springs 34, an image sensor module 35 and a filter 36.

The imaging lens module 31 includes at least one optical imaging lens element 311 and a unitary member 312, and the imaging lens module 31 has an optical axis OL The at least one optical imaging lens element 311 is disposed in the unitary member 312, and the unitary member 312 is a threadless plastic member made by injection molding.

The axial driving device 32 is configured to drive the at least one optical imaging lens element 311 to move in a direction parallel to the optical axis OL, and the axial driving device 32 includes a casing 321, a base 322, a driving coil 323 and four driving magnets 324.

The base 322 is connected to the casing 321, and the base 322 has a through hole 3221 and an inner inclined surface 3222 surrounding the through hole 3221. In addition, the base 322 further has four gate traces 3225 located in a relatively recessed region of an upper surface of the base 322 facing the casing 321.

The unitary member 312 of the imaging lens module 31 is movably disposed between the casing 321 and the base 322 of the axial driving device 32, such that the at least one optical imaging lens element 311 is disposed in the casing 321. The optical axis OL of the imaging lens module 31 passes through the geometric center of the through hole 3221 of the base 322. Furthermore, the unitary member 312 is movably disposed between the casing 321 and the base 322 via the upper flat spring 33 and the lower flat springs 34. In detail, the upper flat spring 33 and the lower flat springs 34 each include an inner fixed part, an outer fixed part and an elastic part connected to and located between the inner fixed part and the outer fixed part (their reference numerals are omitted). The inner fixed part of the upper flat spring 33 is fixed to the unitary member 312, and the outer fixed part of the upper flat spring 33 is fixed to the inside of the casing 321, so that the unitary member 312 is movable relative to the casing 321. Also, the inner fixed part of each lower flat spring 34 is fixed to the unitary member 312, and the outer fixed part of each lower flat spring 34 is fixed to the base 322, so that the unitary member 312 is movable relative to the base 322. In this embodiment, a minimum inner diameter Din of the through hole 3221 is smaller than a maximum outer diameter Dout of the imaging lens module 31.

The driving coil 323 is a ring-shaped coil surrounding and coupled to the unitary member 312. In this embodiment, the casing 321 of the axial driving device 32 is also used as a magnet carrier. The driving magnets 324 are fixed to the inside of the casing 321 and together surround the unitary member 312, and the driving magnets 324 face the driving coil 323 in a direction perpendicular to the optical axis OL. In addition, the driving magnets 324 are symmetrically disposed about the optical axis OL, and the driving coil 323 is symmetrically disposed about the optical axis OL. Therefore, a driving force can be generated by an electromagnetic interaction between the driving magnets 324 and the driving coil 323 to drive the unitary member 312 to move in a direction parallel to the optical axis OL. In this embodiment, the four driving magnets 324 are evenly distributed around the unitary member 312 to together generate a resultant force in a direction parallel to the optical axis OL exerted on the unitary member 312 of the imaging lens module 31 so as to drive the unitary member 312 along with the at least one optical imaging lens element 311 therein to move in a direction parallel to the optical axis OL.

In this embodiment, as shown in FIG. 19, the outer fixed part of the upper flat spring 33 is clamped by and fixed between the casing 321 and the driving magnets 324.

The image sensor module 35 is disposed on an image side of the axial driving device 32, and the image sensor module 35 includes a main PCB 351, an expansion PCB 356, an image stabilizer 354, three prepressed elements 357, a flexible printed circuit (FPC) 358, an image sensor 353 and a substrate 355.

The image stabilizer 354 is configured to drive the image sensor 353 to move in at least one direction that is perpendicular to the optical axis OL. In this embodiment, the image stabilizer 354 includes three piezoelectric motors 3544, and the piezoelectric motors 3544 and the elastic prepressed elements 357 together connect the expansion PCB 356 to the main PCB 351, such that the expansion PCB 356 is movable relative to the main PCB 351. Furthermore, the expansion PCB 356 can be driven by the piezoelectric motors 3544 to move in a direction perpendicular to the optical axis OL or rotate about the optical axis OL (as indicated by the arrows in FIG. 22) relative to the main PCB 351.

The FPC 358 includes a first board part 3581 and a second board part 3582. The first board part 3581 is disposed on the expansion PCB 356, and the second board part 3582 is disposed on the main PCB 351. The first board part 3581 is connected to the second board part 3582 by, for example, a flat flexible cable, so the first board part 3581 is movable relative to the second board part 3582.

The image sensor 353 is disposed on the expansion PCB 356 and configured to convert light passing through the imaging lens module 31 into an image signal. In this embodiment, the image sensor 353 is electrically connected to the first board part 3581 of the FPC 358 so as to be electrically connected to the main PCB 351 via the FPC 358 and transmit an electrical signal of the image sensor 353. In addition, the image sensor 353 is movable relative to the main PCB 351; that is, the connection via the FPC 358 can provide the image sensor 353 a degree of freedom of movement perpendicular to the optical axis OL or a degree of freedom of rotation about the optical axis OL.

The substrate 355 is fixed to the main PCB 351 and faces the axial driving device 32, and the substrate 355 and the base 322 of the axial driving device 32 are abutted against each other. In addition, the substrate 355 has an opening 3551 exposing the image sensor 353 on the expansion PCB 356, so that light passing through the imaging lens module 31 can travel into the image sensor 353.

The base 322 of the axial driving device 32 has a first axial assembling structure 3224, and the substrate 355 of the image sensor module 35 has a second axial assembling structure 3552. The shape of the first axial assembling structure 3224 and the shape of the second axial assembling structure 3552 are circular on the inside and rectangular on the outside. The first axial assembling structure 3224 is abutted against the second axial assembling structure 3552, so that the imaging lens module 31 is aligned with the image sensor module 35 in a direction along the optical axis OL. In addition, the first axial assembling structure 3224 is located at a bottom of the base 322 facing the image sensor module 35, and the first axial assembling structure 3224 is recessed from the bottom in a direction away from the image sensor module 35; the second axial assembling structure 3552 is located at a top of the substrate 355 facing the axial driving device 32, and the second axial assembling structure 3552 protrudes from the top of the substrate 355 towards the axial driving device 32.

As shown in FIG. 20, the first axial assembling structure 3224 includes a plane surface 32241 and an inclined surface 32242 connected to each other and forming an angle therebetween, and the second axial assembling structure 3552 includes a plane surface 35521 and an inclined surface 35522 connected to each other and forming an angle therebetween. The plane surface 32241 and the inclined surface 32242 of the first axial assembling structure 3224 are respectively abutted against the plane surface 35521 and the inclined surface 35522 of the second axial assembling structure 3552. In addition, the plane surface 32241 and the plane surface 35521 are substantially perpendicular to the optical axis OL so as to space apart the imaging lens module 31 and the image sensor 353 and prevent the imaging lens module 31 from tilting. The inclined surface 32242 and the inclined surface 35522 are configured to align the optical axis OL of the imaging lens module 31 with the geometric center of the image sensor 353. Moreover, the inclined surface 35522 of the second axial assembling structure 3552 surrounds the inclined surface 32242 of the first axial assembling structure 3224.

In this embodiment, the optical axis OL passes through the center of the first axial assembling structure 3224 and the center of the second axial assembling structure 3552, and the first axial assembling structure 3224 and the second axial assembling structure 3552 surround the through hole 3221 of the base 322. The first axial assembling structure 3224 is axisymmetric about the optical axis OL, and the second axial assembling structure 3552 is axisymmetric about the optical axis OL. In addition, the surfaces of the first axial assembling structure 3224 and the second axial assembling structure 3552 are smooth surfaces.

In this embodiment, an area surrounded by the inner inclined surface 3222 of the base 322 tapers off towards the image sensor module 35 along the optical axis OL, so that the through hole 3221 of the base 322 forms a tip-end aperture; that is, the tip-end aperture tapers off towards the image sensor module 35 in a direction parallel to the optical axis OL.

The filter 36 is disposed on the substrate 355 and covers the opening 3551 of the substrate 355. The filter 36 is located between the imaging lens module 31 and the image sensor 353 and configured to filter specific wavelengths of incident light. In this embodiment, the substrate 355 is also used as a support frame for carrying the filter 36.

4th Embodiment

Figure 23:
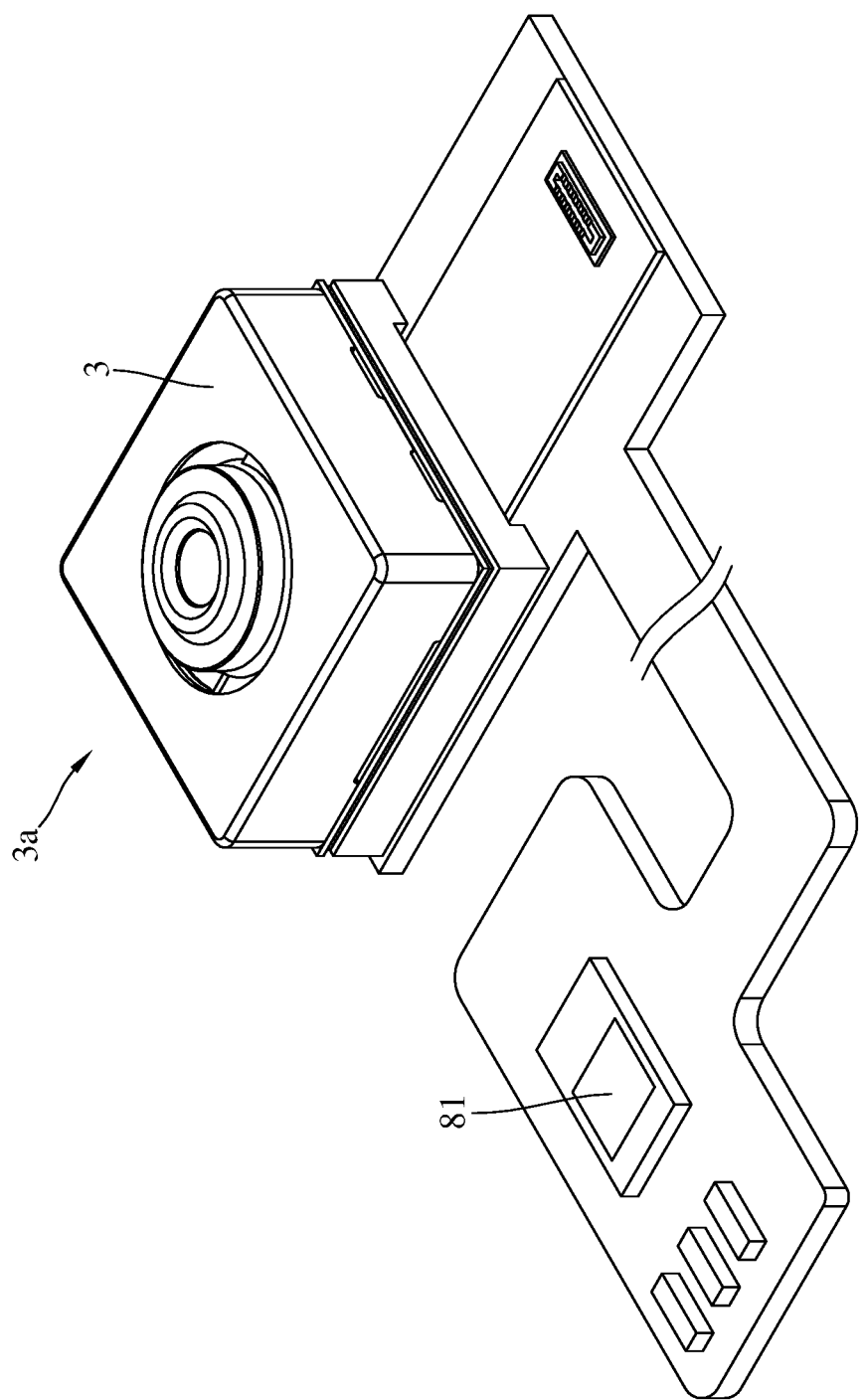
FIG. 23 is a perspective view of a camera module according to the 4th embodiment of the present disclosure.

Please refer to FIG. 23, which is a perspective view of a camera module according to the 4th embodiment of the present disclosure. In this embodiment, the camera module 3a includes the camera module 3 disclosed in the 3rd embodiment and a flash module 81. In some other configurations, a camera module may include the camera module 1 disclosed in the 1st embodiment or the camera module 2 disclosed in the 2nd embodiment and a flash module, but the present disclosure is not limited thereto.

The imaging light converges in the imaging lens module 31 of the camera module 3a to generate an image with the axial driving device 32 utilized for image focusing on an image surface and the image sensor module 35, and the generated image is then digitally transmitted to other electronic component for further processing.

The axial driving device 32 is favorable for obtaining a better imaging position of the imaging lens module 31, so that a clear and sharp image of the imaged object can be captured by the imaging lens module 31 in different object distances. In addition, the image sensor module 35, which is disposed on the image surface, can feature high photosensitivity and low noise to provide higher image quality.

The image stabilizer 354 of the image sensor module 35 is configured to work with the axial driving device 32 is to provide optical image stabilization (01S). The axial driving device 32 working with the image stabilizer 354 is favorable for compensating for pan and tilt of the imaging lens module 31 to reduce blurring associated with motion during exposure. In some cases, the compensation can be provided by electronic image stabilization (EIS) with image processing software, thereby improving image quality while in motion or low-light conditions.

The flash module 81 can be activated for light supplement when capturing images to improve image quality.

Figure 24:
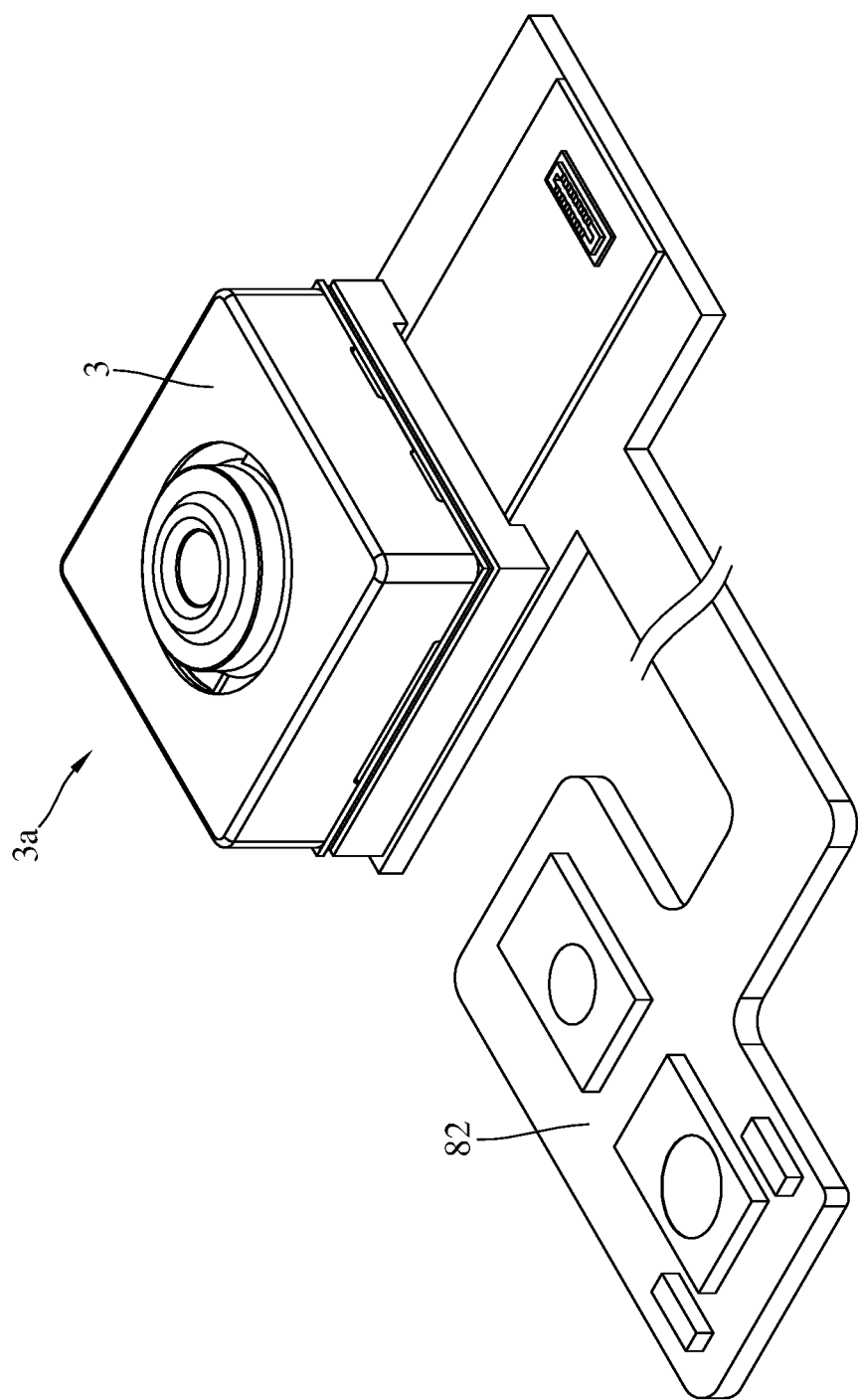
FIG. 24 is a perspective view of another camera module according to one embodiment of the present disclosure.

The present disclosure is not limited to the camera module 3a in FIG. 23. FIG. 24 is a perspective view of another camera module according to one embodiment of the present disclosure, wherein the camera module 3a includes the camera module 3 disclosed in the 3rd embodiment and a focus assist module 82. The focus assist module 82 is configured to detect an object distance to achieve fast auto focusing. The light beam emitted from the focus assist module 82 can be either conventional infrared or laser.

5th Embodiment

Figure 25:
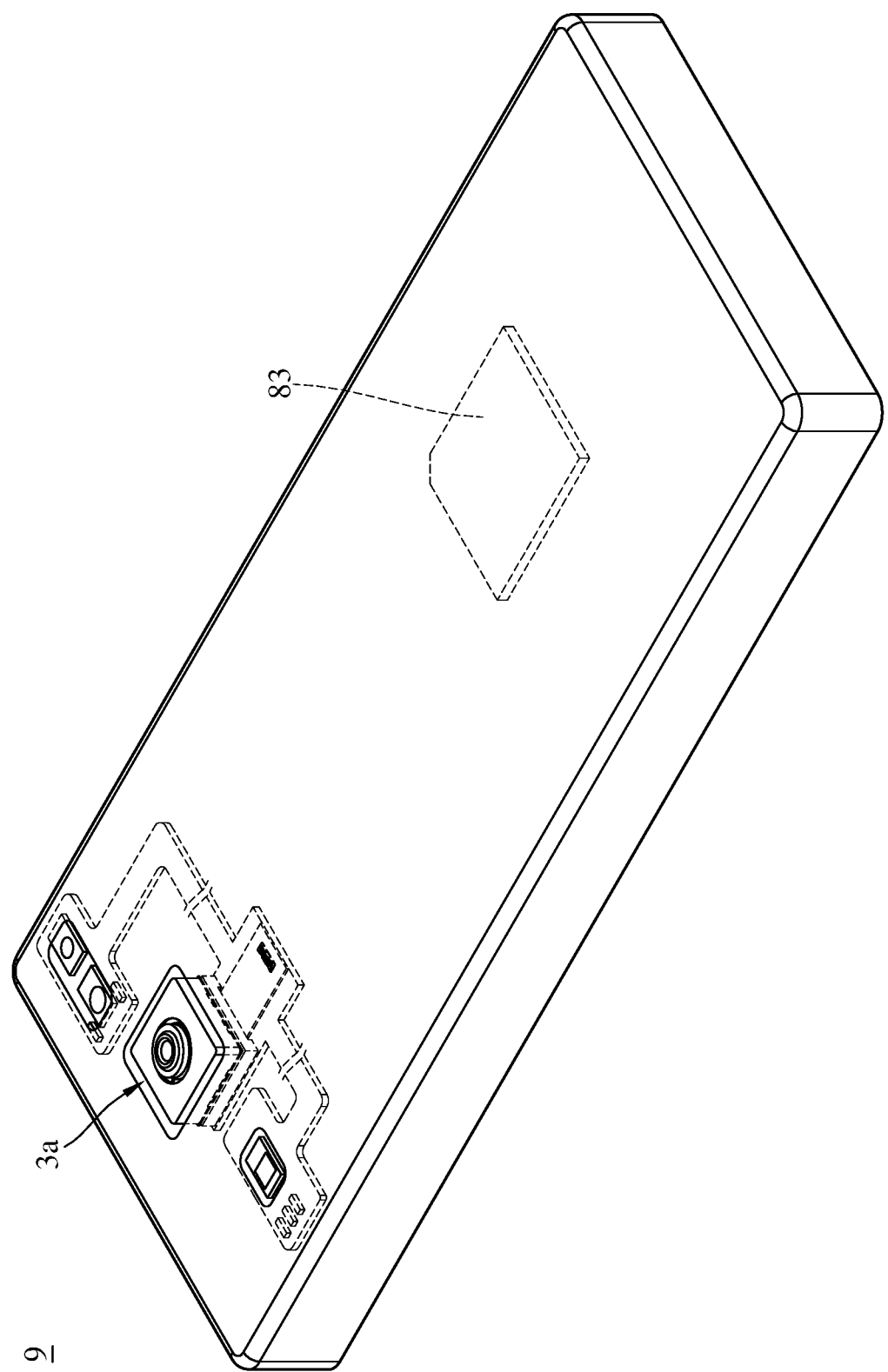
FIG. 25 is one perspective view of an electronic device according to the 5th embodiment of the present disclosure.
Figure 26:
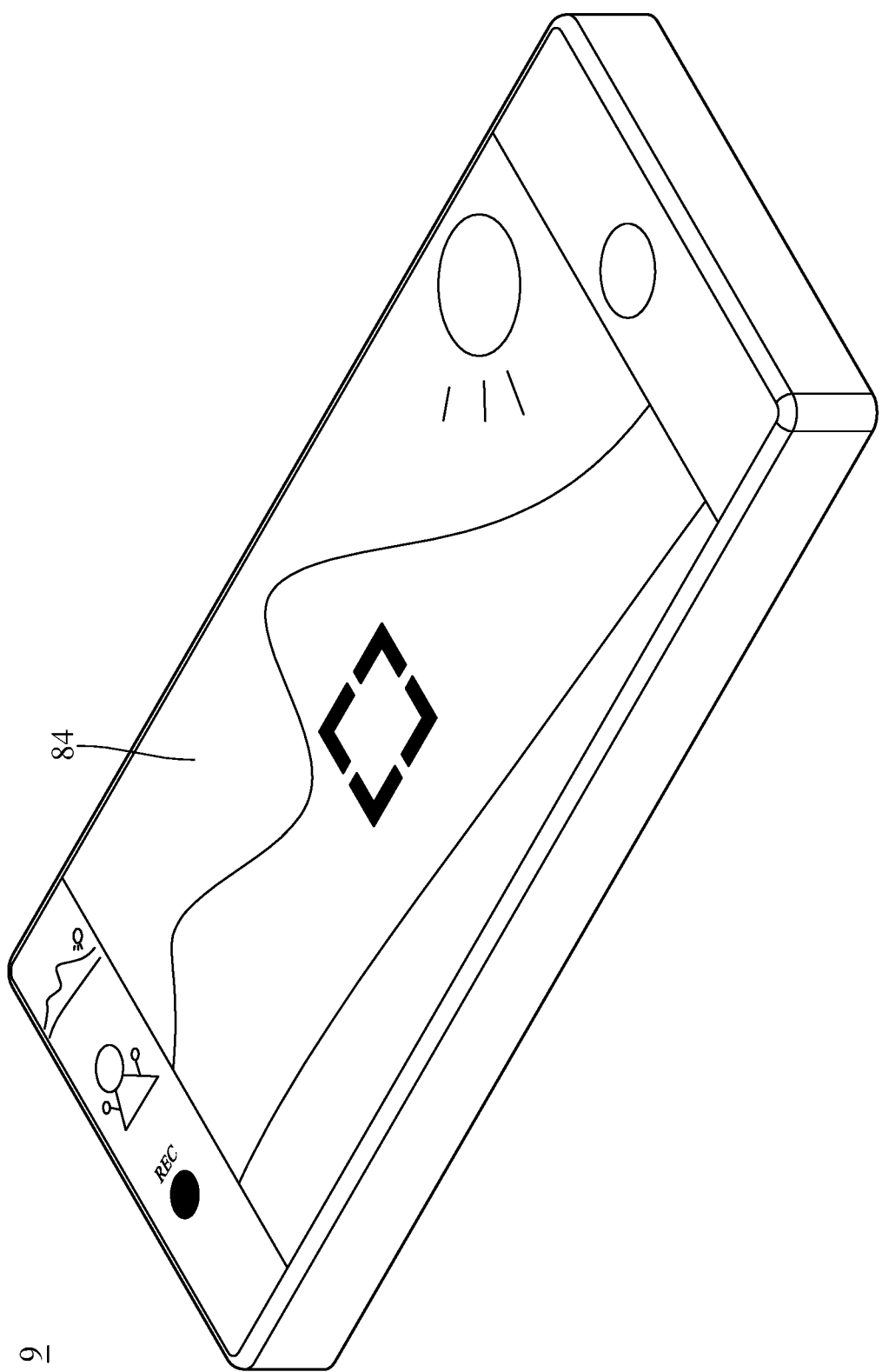
FIG. 26 is another perspective view of the electronic device of FIG. 25.
Figure 27:
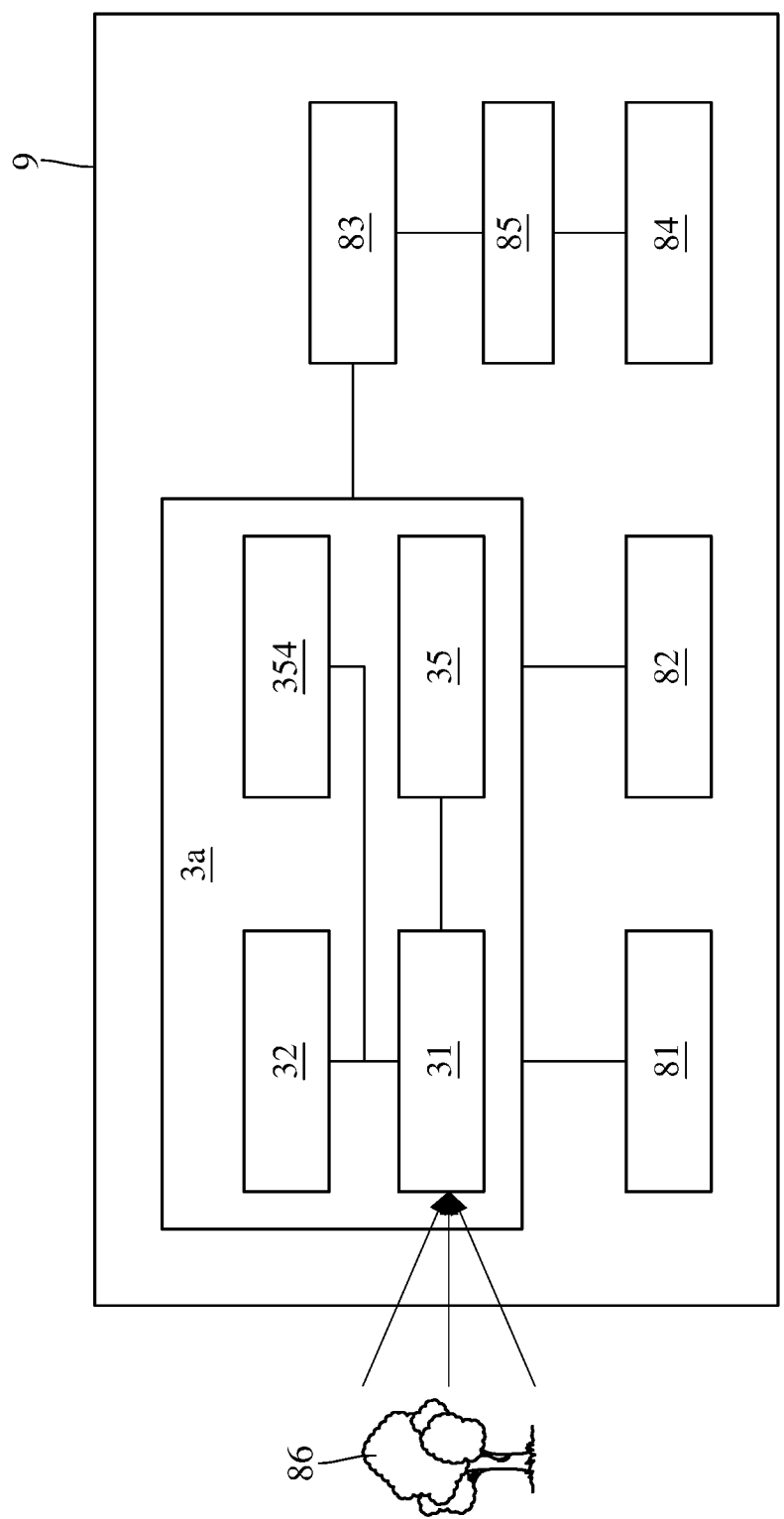
FIG. 27 is a block diagram of the electronic device of FIG. 25.

Please refer to FIG. 25 to FIG. 27. FIG. 25 is one perspective view of an electronic device according to the 5th embodiment of the present disclosure, FIG. 26 is another perspective view of the electronic device of FIG. 25, and FIG. 27 is a block diagram of the electronic device of FIG. 25.

In this embodiment, an electronic device 9 is a smartphone including the camera module 3a disclosed in the 4th embodiment, an image signal processor 83, a display panel (e.g., user interface) 84 and an image software processor 85. In this embodiment, the camera module 3a includes the camera module 3 disclosed in the 3rd embodiment, the flash module 81 and the focus assist module 82.

When a user captures images of an object 86, the light rays converge in the camera module 3a to generate an image(s), and the flash module 81 is activated for light supplement. The focus assist module 82 detects the object distance of the imaged object 86 to achieve fast auto focusing. The image signal processor 83 is configured to optimize the captured image to improve image quality. The light beam emitted from the focus assist module 82 can be either conventional infrared or laser. The display panel 84 can be a touch screen or have a physical shutter button. The user is able to interact with the display panel 84 and the image software processor 85 having multiple functions to capture images and complete image processing. The image processed by the image software processor 85 can be displayed on the display panel 84.

Figure 28:
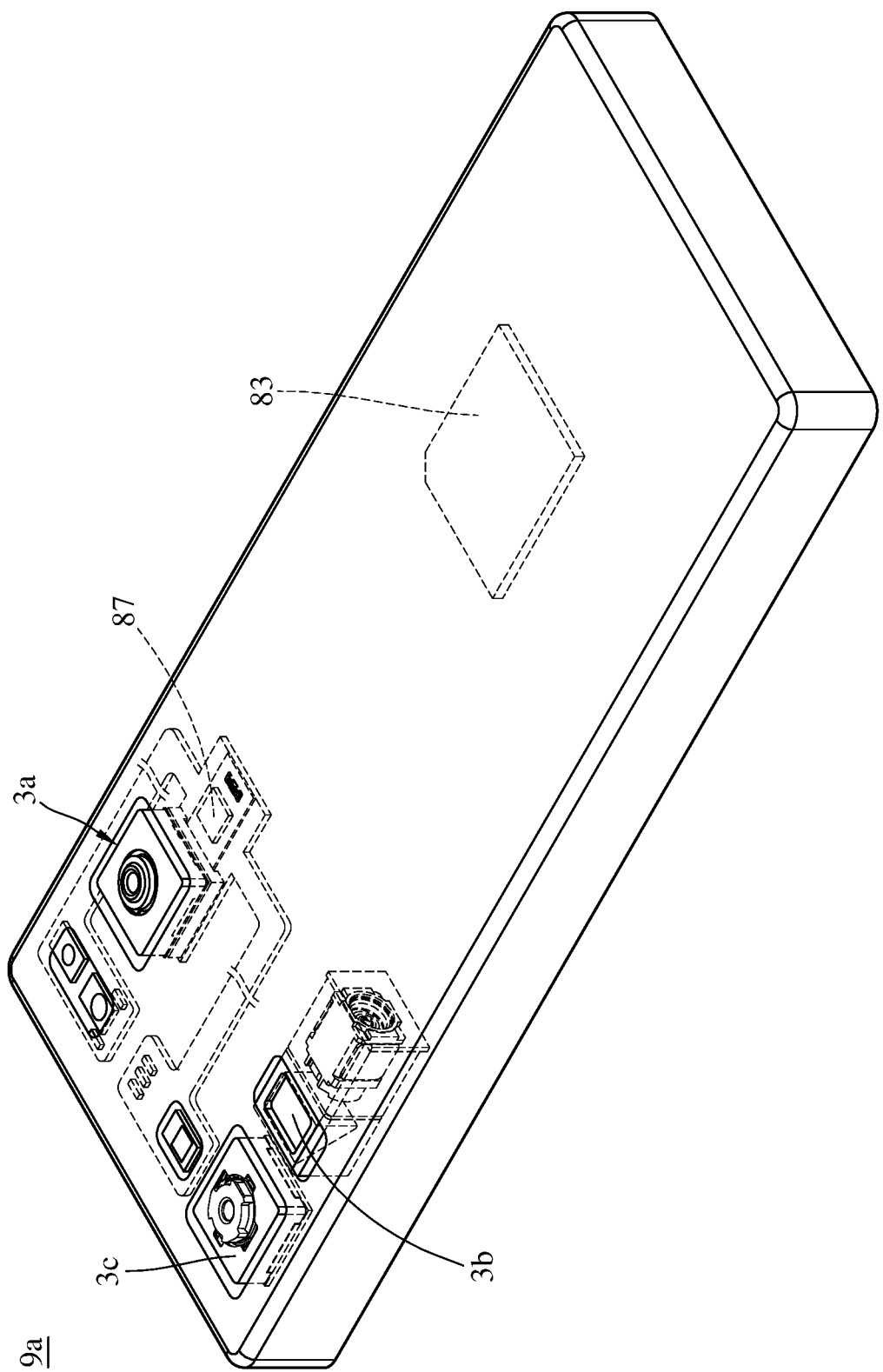
FIG. 28 is a perspective view of another electronic device according to one embodiment of the present disclosure.

The electronic device of the present disclosure is not limited to the number of camera module as described above. FIG. 28 is a perspective view of another electronic device according to one embodiment of the present disclosure. An electronic device 9a is similar to the electronic device 9, and the electronic device 9a further includes a camera module 3b and a camera module 3c. The camera module 3a, the camera module 3b and the camera module 3c all face the same direction and each has a single focal point. In addition, the camera module 3a, the camera module 3b and the camera module 3c have different fields of view (e.g., the camera module 3b is a telephoto camera module, the camera module 3c is a wide-angle camera module, and the camera module 3a has a field of view ranging between the camera module 3b and the camera module 3c), such that the electronic device 9a has various magnification ratios so as to meet the requirement of optical zoom functionality. Furthermore, in this embodiment, the camera module 3a further includes an expansion image signal processor 87. When camera module 3a works with the telephoto camera module 3b and wide-angle camera module 3c, the expansion image signal processor 87 provides zoom functionality for images on the touch screen so as to meet image processing requirements for multiple camera modules. The electronic device 9a equipped with the camera module 3a has various modes of different photographing functions, such as zoom function, telephotography, multi-camera recording, selfie-optimized function, and high dynamic range (HDR) and 4K resolution imaging under low-light conditions.

The smartphone in this embodiment is only exemplary for showing the camera modules 1, 2, 3 and 3a of the present disclosure installed in an electronic device, and the present disclosure is not limited thereto. The camera modules 1, 2, 3 and 3a can be optionally applied to optical systems with a movable focus. Furthermore, the camera modules 1, 2, 3 and 3a features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A camera module, comprising:
an imaging lens module, comprising at least one optical imaging lens element, and the imaging lens module having an optical axis;

an axial driving device, configured to drive the at least one optical imaging lens element to move in a direction parallel to the optical axis, and the axial driving device comprising:
  a casing, wherein the at least one optical imaging lens element is disposed in the casing; and
  a base, connected to the casing, wherein the base has a through hole, and the optical axis passes through a center of the through hole; and
an image sensor module, disposed on an image side of the axial driving device, and the image sensor module comprising:
  an image sensor, configured to convert light passing through the imaging lens module into an image signal; and
  a substrate, facing the axial driving device, wherein the substrate and the base of the axial driving device are abutted against each other;
wherein the base has a first axial assembling structure, the substrate has a second axial assembling structure, and the first axial assembling structure is abutted against the second axial assembling structure, so that the imaging lens module is aligned with the image sensor module in a direction along the optical axis;
wherein the first axial assembling structure comprises a plane surface and at least one inclined surface connected to each other and forming an angle therebetween, the second axial assembling structure comprises a plane surface and at least one inclined surface connected to each other and forming an angle therebetween, the plane surfaces are substantially perpendicular to the optical axis, the plane surface of the first axial assembling structure is abutted against the plane surface of the second axial assembling structure, and the at least one inclined surface of the first axial assembling structure is abutted against the at least one inclined surface of the second axial assembling structure.

2. The camera module of claim 1, wherein the first axial assembling structure and the second axial assembling structure have smooth surfaces.

3. The camera module of claim 1, wherein the first axial assembling structure is located at a bottom of the base facing the image sensor module, the first axial assembling structure protrudes from the bottom of the base towards the image sensor module, the second axial assembling structure is located at a top of the substrate facing the axial driving device, and the second axial assembling structure is recessed from the top of the substrate in a direction away from the axial driving device.

4. The camera module of claim 1, wherein the at least one inclined surface of the second axial assembling structure surrounds the at least one inclined surface of the first axial assembling structure.

5. The camera module of claim 1, wherein the optical axis passes through a center of the first axial assembling structure and a center of the second axial assembling structure, and the first axial assembling structure and the second axial assembling structure surround the through hole.

6. The camera module of claim 1, wherein the axial driving device further comprises a driving coil and a driving magnet, the driving coil is disposed on a periphery of the imaging lens module, and the driving magnet and the driving coil face each other in a direction perpendicular to the optical axis.

7. The camera module of claim 6, wherein the driving magnet is symmetrically disposed about the optical axis, and the driving coil is symmetrically disposed about the optical axis.

8. The camera module of claim 1, wherein the image sensor module further comprises an image stabilizer configured to drive the image sensor to move in at least one direction that is perpendicular to the optical axis.

9. The camera module of claim 1, wherein the through hole is a tip-end aperture, the base further has an inner inclined surface that surrounds the tip-end aperture, and an area surrounded by the inner inclined surface tapers off towards the image sensor module.

10. The camera module of claim 9, wherein a minimum inner diameter of the through hole is smaller than a maximum outer diameter of the imaging lens module.

11. The camera module of claim 1, wherein the base further has at least three gate traces.

12. The camera module of claim 1, wherein the imaging lens module further comprises a unitary member, the at least one optical imaging lens element is disposed in the unitary member, the unitary member is disposed between the casing and the base of the axial driving device, and a driving coil of the axial driving device is disposed on a periphery of the unitary member.

13. The camera module of claim 12, further comprising a position sensing magnet and a position sensor, wherein the position sensing magnet is disposed on the unitary member, the position sensor is disposed on at least one of the substrate and the base, and the position sensor corresponds to the position sensing magnet to detect a position of the imaging lens module.

14. The camera module of claim 1, wherein the base comprises a terminal part, the terminal part extends towards the substrate in a direction parallel to the optical axis, the terminal part is soldered to the substrate, and the terminal part is configured to provide a driving signal to the axial driving device.

15. An electronic device, comprising:
  the camera module of claim 1.

* * * * *